(12) United States Patent
Okada

(10) Patent No.: US 12,276,778 B2
(45) Date of Patent: Apr. 15, 2025

(54) ZOOM LENS AND IMAGING DEVICE

(71) Applicant: Tamron Co., Ltd., Saitama (JP)

(72) Inventor: Keisuke Okada, Saitama (JP)

(73) Assignee: TAMRON CO., LTD., Saitama (JP)

(*) Notice: Subject to any disclaimer, the term of this patent is extended or adjusted under 35 U.S.C. 154(b) by 203 days.

(21) Appl. No.: 18/200,223

(22) Filed: May 22, 2023

(65) Prior Publication Data

US 2023/0400671 A1    Dec. 14, 2023

(30) Foreign Application Priority Data

Jun. 13, 2022 (JP) ................. 2022-095219

(51) Int. Cl.
| | | |
|---|---|---|
| G02B 13/00 | (2006.01) | |
| G02B 15/14 | (2006.01) | |
| G02B 15/15 | (2006.01) | |
| H04N 23/55 | (2023.01) | |
| G03B 13/34 | (2021.01) | |

(52) U.S. Cl.
CPC ....... *G02B 13/009* (2013.01); *G02B 13/0045* (2013.01); *G02B 15/1465* (2019.08); *G02B 15/15* (2013.01); *H04N 23/55* (2023.01); *G03B 13/34* (2013.01)

(58) Field of Classification Search
CPC .............. G02B 13/009; G02B 13/0045; G02B 15/1465; G02B 15/15; G02B 15/1461; H04N 23/55; G03B 13/34

USPC ....... 359/691, 692, 754, 795, 717, 745, 793, 359/797

See application file for complete search history.

(56) References Cited

U.S. PATENT DOCUMENTS

| | | | | |
|---|---|---|---|---|
| 4,984,877 A | * | 1/1991 | Ito ................ | G02B 15/16 359/795 |
| 2020/0333569 A1 | * | 10/2020 | Kondo ............ | G02B 9/62 |

FOREIGN PATENT DOCUMENTS

| | | |
|---|---|---|
| JP | 2014-149483 A | 8/2014 |
| JP | 2021-067805 A | 4/2021 |

* cited by examiner

*Primary Examiner* — Yogesh K Aggarwal
(74) *Attorney, Agent, or Firm* — Paratus Law Group, PLLC

(57) ABSTRACT

A zoom lens includes: a first lens group having negative refractive power and a subsequent group in order from an object side to an image side. The subsequent group includes, in order from an object side to an image side, a Gp1 group including one or more lens groups and having positive refractive power as a whole, a Gn1 group including one or more lens groups and having negative refractive power as a whole, a Gp2 group including one or more lens groups and having positive refractive power as a whole, and a Gn2 group including one or more lens groups and having negative refractive power as a whole. An aperture diaphragm is disposed closer to an object side than the Gp2 group, an interval between adjacent lens groups changes at least during one of zooming and focusing, and a predetermined expression is satisfied.

17 Claims, 15 Drawing Sheets

ZOOM LENS AND IMAGING DEVICE

CROSS-REFERENCE TO RELATED APPLICATIONS

This application is based on and claims the benefit of priority from Japanese Patent Application No. 2022-095219, filed on Jun. 13, 2022, the entire contents of which are incorporated herein by reference.

BACKGROUND OF THE INVENTION

Technical Field

The present invention relates to a zoom lens and an imaging device.

Related Art

In an imaging device using a solid-state image sensor such as a digital camera or a video camera, a solid-state image sensor has been increasing in the number of pixels in recent years, and therefore a lens system is required to have higher performance than before. In addition, with the downsizing of the camera, there is an increasing demand for downsizing of the zoom lens.

Under such circumstances, for example, JP 2014-149483 A and JP 2021-67805 A disclose zoom lenses.

SUMMARY OF THE INVENTION

JP 2014-149483 A is a standard large-diameter zoom lens for a so-called mirrorless camera, in which the amount of movement of a first lens group and a second lens group during zooming is large, so that the total optical length is long, and the change in the on-axis light flux with the movement during zooming is large. Therefore, the lens diameter is also large, and the demand for downsizing of a product is not met.

JP 2021-67805 A is a high-magnification zoom lens for a so-called mirrorless camera. The amount of movement of a first lens group and a second lens group during zooming is large, so that the total optical length is long, and the change in the on-axis light flux with the movement during zooming is large. Therefore, the lens diameter is also large, and the demand for downsizing of a product is not met.

Therefore, an object of the present invention is to provide a zoom lens and an imaging device that are compact and have good optical performance.

A zoom lens includes: a first lens group having negative refractive power and a subsequent group in order from an object side to an image side. The subsequent group includes, in order from an object side to an image side, a Gp1 group including one or more lens groups and having positive refractive power as a whole, a Gn1 group including one or more lens groups and having negative refractive power as a whole, a Gp2 group including one or more lens groups and having positive refractive power as a whole, and a Gn2 group including one or more lens groups and having negative refractive power as a whole. An aperture diaphragm is disposed closer to an object side than the Gp2 group, an interval between adjacent lens groups changes at least during one of zooming and focusing, and a following expression is satisfied.

$$0.40 < fn1/fn2 < 3.55 \quad (1)$$

$$0.50 < (m1-mp1)/fw < 2.30 \quad (2)$$

$$1.00 < Lw/fw < 9.00 \quad (3)$$

Here,
fn1 is a focal length of the Gn1 group during infinity focus at a telephoto end,
fn2 is a focal length of the Gn2 group during infinity focus at a telephoto end,
m1 is an amount of movement of the first lens group during infinity focus when zooming from a wide angle end to a telephoto end,
mp1 is an amount of movement of the Gp1 group during infinity focus during zooming from a wide angle end to a telephoto end,
Lw is a total optical length of the zoom lens during infinity focus at a wide angle end, and
fw is a focal length of the zoom lens during infinity focus at a wide angle end.

In order to solve the above problems, an imaging device according to the present invention includes the zoom lens and an image sensor that converts an optical image formed by the zoom lens into an electrical signal.

According to the present invention, it is possible to provide a compact zoom lens that can withstand photographing with a high-pixel image sensor in recent years and has excellent optical performance.

DESCRIPTION OF THE EMBODIMENTS

Figure 1:
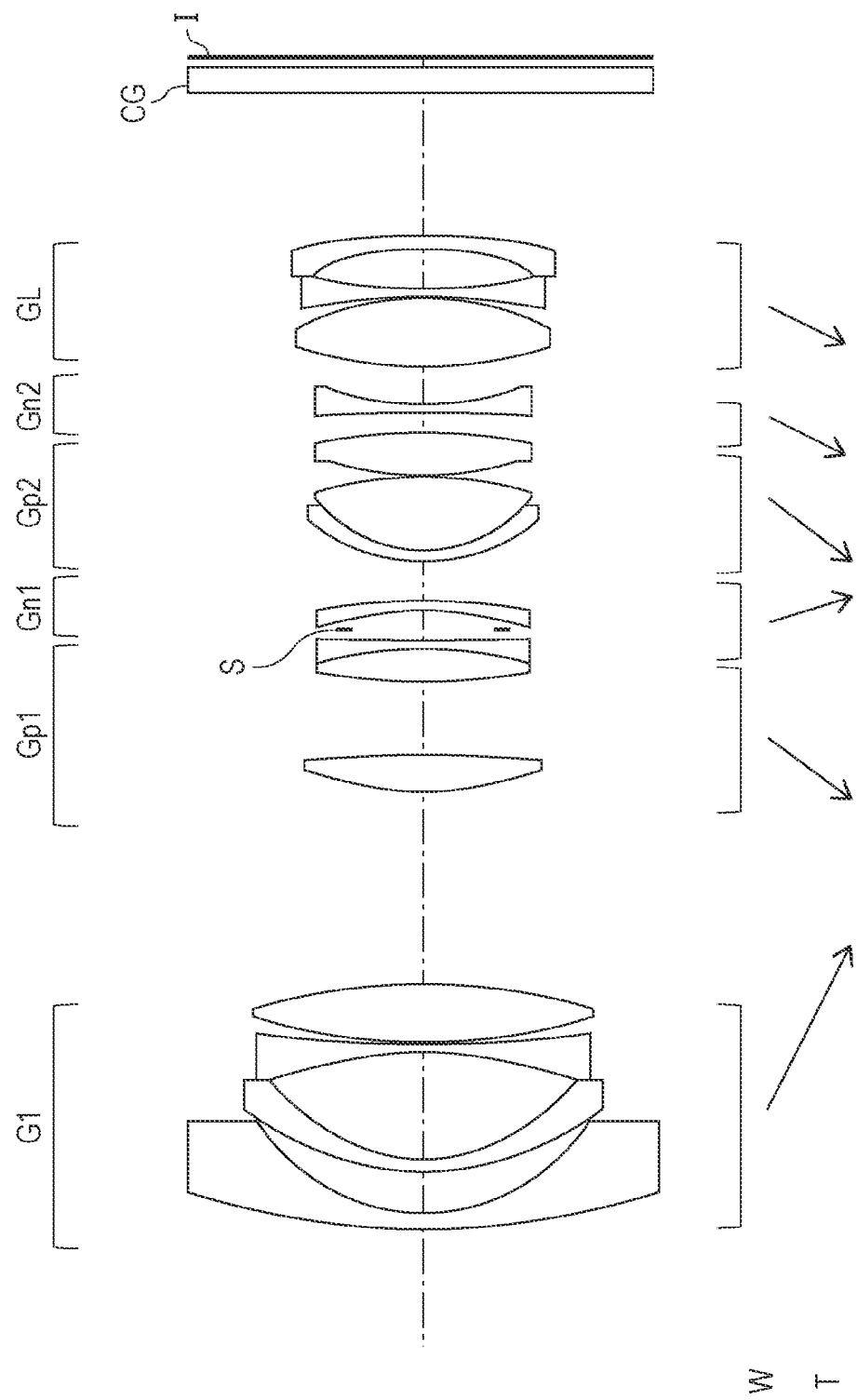
FIG. 1 is a cross-sectional view illustrating a lens configuration example of a zoom lens according to Example 1.

Hereinafter, embodiments of a zoom lens and an imaging device according to the present invention will be described.

However, the zoom lens and the imaging device described below are one aspect of the zoom lens and the imaging device according to the present invention, and the zoom lens and the imaging device according to the present invention are not limited to the following aspects.

1. Zoom Lens 1-1. Optical Configuration

A zoom lens according to the present invention includes, in order from an object side to an image side, a first lens group having negative refractive power and a subsequent group, and the subsequent group includes, in order from the object side to the image side, a Gp1 group including one or more lens groups and having positive refractive power as a whole, a Gn1 group including one or more lens groups and having negative refractive power as a whole, and a Gp2 group including one or more lens groups and having positive refractive power as a whole. With this configuration, it is easy to obtain a zoom lens having a relatively high magnification. In addition, it is preferable to have a Gn2 group on the image side of the Gp2 group. In addition, it is preferable to include a GL group on the most image side of the zoom lens. In a case where each group includes a plurality of lens groups, the refractive power of each group at the telephoto end may be as described above.

(1) First Lens Group

A specific configuration of the first lens group is not particularly limited as long as the first lens group is a lens group having negative refractive power. The first lens group preferably includes four or less lenses in order to achieve downsizing. In addition, the first lens group preferably includes two or three negative lenses and one positive lens in order from the object side to the image side, and particularly preferably includes a negative meniscus lens, a negative meniscus lens, a negative lens, and a positive lens. Preferably, the first lens group includes a negative meniscus lens, a negative meniscus lens, and a positive lens in order from the object side to the image side.

The lens group means a set of one or more lenses in which the interval does not change in at least one of zooming and focusing. The interval between the adjacent lens groups changes in at least one of zooming and focusing. In the present application, the Gp1 group, the Gn1 group, the Gp2 group, the Gn2 group, and the GL group mean names of groups including one or more lens groups, and an interval between the groups changes in at least one of zooming and focusing.

(2) Gp1 Group

A specific configuration of the Gp1 group is not particularly limited as long as the Gp1 group includes at least one lens group and has positive refractive power as a whole. The Gp1 group is preferably composed of two lens groups or one lens group. The Gp1 group preferably has a positive lens on the most object side in correcting the aberration. The Gp1 group preferably has a biconcave lens on the image side of the positive lens disposed closest to the object side.

(3) Gn1 Group

A specific configuration of the Gn1 group is not particularly limited as long as the Gn1 group includes at least one lens group disposed on the image side of the Gp1 group and has negative refractive power as a whole. The Gn1 group may be composed of two lens groups, but is preferably composed of one lens group. In order to correct chromatic aberration, it is preferable to include a positive lens and a negative lens. In addition, in order to correct the aberration, it is preferable to include a negative meniscus lens having a convex object-side surface on the most image side of the Gn1 group.

(4) Gp2 Group

A specific configuration of the Gp2 group is not particularly limited as long as the Gp2 group includes at least one lens group disposed on the image side of the Gn1 group and has positive refractive power as a whole. The Gp2 group may be composed of two lens groups, but is preferably composed of one lens group. In order to correct chromatic aberration, it is preferable to include a positive lens and a negative lens.

(5) Gn2 Group

A specific configuration of the Gn2 group is not particularly limited as long as the Gn2 group includes at least one lens group disposed on the image side of the Gp2 group and has negative refractive power as a whole. The Gn2 group may be composed of two lens groups, but is preferably composed of one lens group.

(6) GL Group

The GL group includes at least one or more lens groups disposed closest to the image side of the zoom lens, and a specific configuration thereof is not particularly limited. The GL group may be composed of two lens groups, but is preferably composed of one lens group. By disposing a lens having positive refractive power on the most object side of the GL group, the height of the marginal ray passing through the GL group can be lowered, and variation in field curvature during zooming and focusing can be suppressed. It is more preferable to dispose the positive lens GLp on the most object side of the GL group. The GL group preferably includes at least one or more negative lenses GLn.

(7) Aperture Diaphragm

By disposing the aperture diaphragm on the object side with respect to the Gp2 group, the aperture diameter can be reduced by the focusing action of the Gp1 group, which is effective for downsizing the product. Further, by disposing the Gn1 group adjacent to the aperture diaphragm, the spherical aberration of under generated in the Gp1 group can be corrected by the spherical aberration of over of the Gn1 group, which is desirable in order to facilitate the increase in the aperture diameter.

1-2. Operation (1) Zooming

The zooming from the wide angle end to the telephoto end is performed by changing the interval between the adjacent lens groups. It is preferable that the two non-adjacent lens groups included in the subsequent group move along the same trajectory. In particular, it is preferable that at least a part of the Gp1 group and at least a part of the Gp2 group move on the optical axis along the same trajectory. At least a part of the Gp1 group is at least one or more lens groups included in the Gp1 group. At least a part of the Gp2 group is at least one or more lens groups included in the Gp2 group. As compared with the case of independently moving, the mechanism configuration can be simplified, and the lens barrel diameter can be easily downsized. Further, relative eccentricity of the lens group having the same trajectory can be suppressed, and deterioration of performance at the time of assembly can be prevented.

(2) Focusing

It is preferable that the zoom lens is focused by changing an interval between adjacent lens groups on the image side of the Gp2 group. With this configuration, the light flux diameter passing through the focusing group can be reduced by the focusing action of the Gp2 group, which is effective for downsizing the product. Further, in the zoom lens, by using the Gn2 group as a focusing group, it is possible to reduce the size and performance fluctuation.

1-3. Expressions

The zoom lens desirably adopts the above-described configuration and satisfies at least one of the following expressions.

1-3-1. Expression (1)

$$0.40 < fn1/fn2 < 3.55 \tag{1}$$

Here, fn1 is a focal length of the Gn1 group during infinity focus at the telephoto end, and fn2 is a focal length of the Gn2 group during infinity focus at the telephoto end.

Expression (1) defines the ratio of the focal lengths of the Gn1 group and the Gn2 group. By satisfying the range defined by Expression (1), the zoom lens can be downsized, and good optical performance can be obtained over the entire zoom range.

If the value is less than the lower limit value of Expression (1), the refractive power of the Gn1 group is stronger than a proper value, or the refractive power of the Gn2 group is weaker than the proper value, or both of them are indicated, and the excessive spherical aberration occurring in the Gn1 group becomes excessive, and the aberration correction in the entire system becomes difficult, which is undesirable. On the other hand, when the value exceeds the upper limit value of Expression (1), the refractive power of the Gn1 group is weaker than the proper value, or the refractive power of the Gn2 group is stronger than the proper value, or both of them are indicated, and the excessive spherical aberration occurring in the Gn2 group becomes excessive, and it becomes difficult to correct the aberration in the entire system, which is undesirable.

In order to obtain the above effect, the lower limit value of Expression (1) is preferably any of 0.50, 0.70, 1.00, 1.30, 1.50, and 1.70. The upper limit value of Expression (1) is preferably any one of 3.30, 3.00, 2.80, and 2.60.

1-3-2. Expression (2)

$$0.50 < (m1 - mp1)/fw < 2.30 \tag{2}$$

Here, m1 is the amount of movement of the first lens group during infinity focus when zooming from the wide angle end to the telephoto end;

mp1 is the amount of movement of the Gp1 group during infinity focus when zooming from wide angle end to telephoto end, and fw is a focal length of the zoom lens during infinity focus at a wide angle end.

Expression (2) defines the ratio between the difference in the amount of movement between the first lens group and the Gp1 group when zooming and the focal length of the zoom lens during infinity focus at the wide angle end. Further, the amount of movement is set such that the moving direction from the object side to the image side is positive. When the Gp1 group includes a plurality of movable groups, the amount of movement of the lens group having the largest amount of movement is defined as mp1. By satisfying the range defined by Expression (2), the amount of movements of the first lens group and the Gp1 group when zooming can be kept within an appropriate range, the zoom lens can be downsized, and good optical performance can be obtained in the entire range of zooming.

If the value is less than the lower limit value of Expression (2), it indicates that the amount of movements of the first lens group and the Gp1 group when zooming is smaller than the proper value, and in a case where a desired zooming ratio is to be obtained, the burden of zooming of other groups becomes large, and it becomes difficult to achieve both downsizing of the product and aberration correction in the entire system, which is undesirable. On the other hand, when the value exceeds the upper limit value of Expression (2), it indicates that the amount of movements of the first lens group and the Gp1 group when zooming is larger than the proper value, and in a case where a desired zoom ratio is to be obtained, it is difficult to downsize a product, which is undesirable.

In order to obtain the above effect, the lower limit value of Expression (2) is preferably either 0.60 or 0.70. The upper limit value of Expression (2) is preferably any one of 2.20, 2.10, and 2.00.

1-3-3. Expression (3)

$$1.00 < Lw/fw < 9.00 \tag{3}$$

Here,

Lw is a total optical length of the zoom lens during infinity focus at a wide angle end, and fw is a composite focal length of the zoom lens during infinity focus at a wide angle end.

Expression (3) defines a ratio between a total optical length and a focal length of the zoom lens during infinity focus at a wide angle end. The total optical length indicates a distance from the optical axis center of the most object-side surface of the zoom lens to the image plane, and is a value including the cover glass and the cut filter. By satisfying the range defined by Expression (3), the zoom lens can be downsized, and good optical performance can be obtained in the entire zooming range.

If the value is less than the lower limit value in Expression (3), it indicates that the total optical length at the wide angle end during infinity focus is smaller than the proper value, and it is necessary to increase the refractive power of each group to be higher than the proper value, and the aberration generated in each group becomes larger than the proper value, and it becomes difficult to obtain good optical performance in the entire range of zooming, which is not desirable. On the other hand, when the value exceeds the upper limit value in Expression (3), it indicates that the total optical length during infinity focus at the wide angle end is larger than a proper value, which makes it difficult to downsize the product, which is undesirable.

In order to obtain the above effect, the lower limit value of Expression (3) is preferably any of 3.00, 4.00, 5.00, 5.20, 5.50, 6.00, and 6.50. The upper limit value of Expression (3) is preferably any one of 8.80, 8.60, 8.40, 8.20, 8.00, and 7.80.

1-3-4. Expression (4)

$$0.10 < fp1/fp2 < 10.00 \tag{4}$$

Here, fp1 is a composite focal length of the Gp1 group during infinity focus on telephoto end, and fp2 is a composite focal length of the Gp2 group during infinity focus on telephoto end.

Expression (4) defines the ratio of the focal lengths of the Gp1 group and the Gp2 group. By satisfying the range defined by Expression (4), downsizing of the zoom lens can be achieved.

When the value is less than the lower limit value of Expression (4), the refractive power of the Gp1 group is stronger than the proper value, or the refractive power of the Gp2 group is weaker than the proper value, or both of them are indicated, and the spherical aberration generated in the Gp1 group becomes excessively low, and it becomes difficult to correct the aberration in the entire system, which is undesirable. On the other hand, when the value exceeds the upper limit value of Expression (4), the refractive power of the Gp1 group is weaker than the proper value, or the refractive power of the Gp2 group is stronger than the proper value, or both of them are indicated, and it becomes difficult to reduce the diameter of the lens group on the image side of the Gp1 group, and the spherical aberration and the field curvature of under generated in the Gp2 group become excessive, and it becomes difficult to correct the aberration in the entire system, which is undesirable.

In order to obtain the above effect, the lower limit value of Expression (4) is preferably any of 0.50, 0.75, 1.00, 1.25, 1.50, 1.75, and 2.00. The upper limit value of Expression (4) is preferably any one of 8.00, 6.00, 5.00, 4.00, 3.50, 3.00, and 2.70.

1-3-5. Expression (5)

$$-5.00<f1/fp2<-0.10 \qquad (5)$$

Here,
f1 is a focal length of the first lens group, and
fp2 is a focal length of the Gp2 group during infinity focus at the telephoto end.

Expression (5) defines the ratio of the focal lengths of the first lens group and the Gp2 group. By satisfying the range defined by Expression (5), the diameter of the lens group on the image side of the Gp2 group can be reduced, and the downsizing of the zoom lens can be achieved.

When the value is less than the lower limit value of Expression (5), the refractive power of the first lens group is weaker than the proper value, or the refractive power of the Gp2 group is stronger than the proper value, or both of them are indicated, and the diameter of the first lens group is increased, or the spherical aberration and the field curvature generated in the Gp2 group become excessively low, so that it is difficult to achieve both downsizing of the product and aberration correction in the entire system, which is undesirable. On the other hand, when the value exceeds the upper limit value of Expression (5), the refractive power of the first lens group is stronger than the proper value, or the refractive power of the Gp2 group is weaker than the proper value, or both of them are indicated, which leads to an increase in the diameter of the aperture diaphragm and the lens group on the image side of the Gp2 group, making it difficult to downsize the product, which is undesirable.

In order to obtain the above effect, the lower limit value of Expression (5) is preferably any of −4.00, −3.50, −3.00, −2.75, −2.50, −2.30, and −2.20. The upper limit value of Expression (5) is preferably any one of −0.50, −0.70, −0.90, and −1.10.

1-3-6. Expression (6)

$$1.00<fp1/fw<10.00 \qquad (6)$$

Here,
fp1 is a focal length of the Gp1 group during infinity focus on the telephoto end, and
fw is a focal length of the zoom lens during infinity focus at a wide angle end.

Expression (6) defines a ratio between the focal length of the Gp1 group and the focal length of the zoom lens during infinity focus at the wide angle end. By satisfying the range defined by Expression (6), the diameter of the lens group on the image side of the Gp1 group can be reduced, and the downsizing of the zoom lens can be achieved.

When the value is less than the lower limit value of Expression (6), it indicates that the refractive power of the Gp1 group is stronger than the proper value, and the spherical aberration generated in the Gp1 group becomes excessively low, and it becomes difficult to achieve both the aberration correction in the entire system, which is undesirable. On the other hand, when the value exceeds the upper limit value of Expression (6), it indicates that the refractive power of the Gp1 group is weaker than the proper value, which leads to an increase in the diameter of the lens group on the image side of the Gp1 group, making it difficult to downsize the product, which is undesirable.

In order to obtain the above effect, the lower limit value of Expression (6) is preferably any of 1.25, 1.50, 1.70, 1.90, and 2.00. The upper limit value of Expression (6) is preferably any one of 8.00, 6.00, 5.00, 4.00, 3.50, and 3.00.

1-3-7. Expression (7)

$$0.50<fp2/fw<8.00 \qquad (7)$$

Here,
fp2 is a focal length of the Gp2 group during infinity focus at the telephoto end, and
fw is a focal length of the zoom lens during infinity focus at a wide angle end.

Expression (7) defines a ratio between the composite focal length of the Gp2 group and the focal length of the zoom lens at the wide angle end during infinity focus. By satisfying the range defined by Expression (7), the diameter of the lens group on the image side of the Gp2 group can be reduced, and the downsizing of the zoom lens can be achieved.

When the value is less than the lower limit value of Expression (7), it indicates that the refractive power of the Gp2 group is stronger than the proper value, and the spherical aberration and the field curvature generated in the Gp2 group become excessively low, and it becomes difficult to achieve both the aberration correction in the entire system, which is undesirable. On the other hand, when the value exceeds the upper limit value of Expression (7), it indicates that the refractive power of the Gp2 group is weaker than the proper value, which leads to an increase in the diameter of the lens group on the image side of the Gp2 group, making it difficult to downsize the product, which is undesirable.

In order to obtain the above effect, the lower limit value of Expression (7) is preferably any one of 0.60, 0.70, and 0.80. The upper limit value of Expression (7) is preferably any one of 5.00, 4.00, 3.00, 2.00, 1.70, 1.50, and 1.30.

1-3-8. Expression (8)

$$-8.00<fn2/fw<-1.00 \qquad (8)$$

Here,
fn2 is a focal length of the Gn2 group during infinity focus at the telephoto end, and
fw is a focal length of the zoom lens during infinity focus at a wide angle end.

Expression (8) defines a ratio between the focal length of the Gn2 group and the focal length of the zoom lens during infinity focus at the wide angle end. When the range defined by Expression (8) is satisfied, the diameter of the lens group on the image side of the Gn2 group can be reduced, and the downsizing of the zoom lens can be achieved.

When the value is less than the lower limit value of Expression (8), it indicates that the refractive power of the Gn2 group is weaker than the proper value, it is difficult to reduce the diameter of the group on the image side than the Gn2 group, and it is difficult to downsize the product, which is undesirable. On the other hand, when the value exceeds the upper limit value in Expression (8), it indicates that the refractive power of the Gn2 group is stronger than the proper value, and the excessive field curvature and distortion aberration of the yarn winding occurring in the Gn2 group become excessive, which makes it difficult to correct the aberration in the entire system, which is undesirable.

In order to obtain the above effect, the upper limit value of Expression (8) is preferably either −1.10 or −1.20. The lower limit value of Expression (8) is preferably any one of −6.00, −4.00, −3.50, −3.00, −2.50, −2.30, and −2.10.

1-3-9. Expression (9)

$$1.00<|\beta p1t/\beta p1w|<20.00 \qquad (9)$$

Here,
$\beta p1t$ is a lateral magnification of Gp1 group during infinity focus at a telephoto end, and
$\beta p1w$ is a lateral magnification of the Gp1 group during infinity focus at the wide angle end.

Expression (9) defines the zooming ratio of the Gp1 group when zooming from the wide angle end to the telephoto end. By satisfying the range defined by Expression (9), it is possible to optimize the zooming ratio of the Gp1 group, to realize downsizing of the product and a desired zoom ratio.

When the value is less than the lower limit value of Expression (9), the zooming ratio of the Gp1 group is reduced, the amount of movement of the other lens group becomes larger than the proper value, and it becomes difficult to downsize the product, which is not preferable. On the other hand, when the value exceeds the upper limit value of Expression (9), the zooming ratio of the Gp1 group becomes larger than the proper value, the amount of movement of the Gp1 group becomes larger than the proper value, and downsizing of the product becomes difficult, which is not preferable.

In order to obtain the above effect, the lower limit value of Expression (9) is preferably any of 1.20, 1.40, and 1.60. The upper limit value of Expression (9) is preferably any one of 15.00, 10.00, 8.00, 7.00, and 6.50.

1-3-10. Expression (10)

$$1.00<|\beta p2t/\beta p2w|<15.00 \qquad (10)$$

Here,
$\beta p2t$ is a lateral magnification of the Gp2 group during infinity focus at the telephoto end, and
$\beta p2w$ is a lateral magnification of the Gp2 group during infinity focus at the wide angle end.

Expression (10) defines a zooming ratio of the Gp2 group when zooming from the wide angle end to the telephoto end. By satisfying the range defined by Expression (10), the zooming ratio of the Gp2 group can be optimized to realize downsizing of the product and a desired zoom ratio.

When the value is less than the lower limit value of Expression (10), the zooming ratio of the Gp2 group is reduced, the amount of movement of the other lens group becomes larger than the proper value, and downsizing of the product becomes difficult, which is not preferable. On the other hand, when the value exceeds the upper limit value of Expression (10), the zooming ratio of the Gp2 group becomes larger than the proper value, the amount of movement of the Gp2 group becomes larger than the proper value, and downsizing of the product becomes difficult, which is not preferable.

In order to obtain the above effect, the lower limit value of Expression (10) is preferably either 1.20 or 1.30. The upper limit value of Expression (10) is preferably any of 12.00, 10.00, 8.00, 7.00, 6.00, and 5.50.

1-3-11. Expression (11)

$$1.00<|\beta n2t/\beta n2w|<10.00 \qquad (11)$$

Here,
$\beta n2t$ is a lateral magnification of the Gn2 group during infinity focus at the telephoto end, and
$\beta n2w$ is a lateral magnification of the Gn2 group during infinity focus at the wide angle end.

Expression (11) defines the zooming ratio of the Gn2 group when zooming from the wide angle end to the telephoto end. By satisfying the range defined by Expression (11), the zooming ratio of the Gn2 group can be optimized, the product can be downsized, and a desired zoom ratio can be realized.

When the value is less than the lower limit value of Expression (11), the zooming ratio of the Gn2 group is reduced, the amount of movement of the other lens group becomes larger than the proper value, and downsizing of the product becomes difficult, which is not preferable. On the other hand, if the value exceeds the upper limit value of Expression (11), the zooming ratio of the Gn2 group becomes larger than the proper value, the amount of movement of the Gn2 group becomes larger than the proper value, and downsizing of the product becomes difficult, which is not preferable.

In order to obtain the above effect, the upper limit value of Expression (11) is preferably any of 8.00, 6.00, 5.00, 4.00, 3.00, 2.00, and 1.80.

1-3-12. Expression (12)

$$0.50<|\beta Lt/\beta Lw|<10.00 \qquad (12)$$

Here,
$\beta Lt$ is a lateral magnification of the GL group during infinity focus at the telephoto end, and
$\beta Lw$ is a lateral magnification of the GL group during infinity focus at the wide angle end.

Expression (12) defines the zooming ratio of the GL group when zooming is performed from the wide angle end to the telephoto end. By satisfying the range defined by Expression (12), it is possible to optimize the zooming ratio of the GL group and to realize downsizing of the product and a desired zoom ratio.

If the value is less than the lower limit value in Expression (12), the zooming ratio of the GL group becomes smaller than the proper value, the amount of movement of the other lens group becomes larger than the proper value, and downsizing of the product becomes difficult, which is not preferable. On the other hand, when the value exceeds the upper limit value in Expression (12), the zooming ratio of the GL group becomes larger than the proper value, the amount of movement of the GL group becomes larger than the proper value, and downsizing of the product becomes difficult, which is not preferable.

In order to obtain the above effect, the lower limit value of Expression (12) is preferably any of 0.60, 0.70, and 0.80. The upper limit value of Expression (12) is preferably any of 8.00, 6.00, 4.00, 3.00, 2.00, and 1.50.

1-3-13. Expression (13)

$$1.80<ndLp<2.20 \qquad (13)$$

Here,
$ndLp$ is a refractive index at line d of the positive lens GLp.

Expression (13) defines the refractive index of the material of the positive lens GLp disposed closest to the object side in the GL group. By satisfying the range defined by Expression (13), the height of the marginal ray passing through the GL group can be reduced, and the variation in the field curvature when zooming and focusing can be suppressed.

When the value is less than the lower limit value in Expression (13), the refractive power of the positive lens GLp becomes weaker than the proper value, and the field curvature and the distortion aberration become insufficient in correction, which is undesirable. On the other hand, when the value exceeds the upper limit value in Expression (13), the refractive power of the positive lens GLp becomes stronger than the proper value, and the field curvature and the distortion aberration are overcorrected, which is undesirable.

In order to obtain the above effect, the lower limit value of Expression (13) is preferably any of 1.84, 1.85, 1.86, 1.88, 1.90, and 1.92. The upper limit value of Expression (13) is preferably any one of 2.10, 2.05, 2.00, 1.99, 1.98, 1.96, 1.95, and 1.94.

1-3-14. Expression (14)

$$1.70 < ndLnave < 2.20 \quad (14)$$

Here, ndLnave is an average value of refractive indexes of the negative lenses GLn included in the GL group at line d.

Expression (14) defines the average value of the refractive indexes of the materials of the negative lenses GLn included in the GL group. By satisfying the range defined by Expression (14), the height of the marginal ray passing through the GL group can be reduced, and the variation in the field curvature when zooming and focusing can be suppressed.

When the value is less than the lower limit value of Expression (14), the refractive power of the negative lens GLn included in the GL group becomes weaker than the proper value, and the field curvature and the distortion aberration become insufficient in correction, which is undesirable. On the other hand, when the value exceeds the upper limit value in Expression (14), the refractive power of the negative lens GLn included in the GL group becomes stronger than the proper value, and the field curvature and the distortion aberration are overcorrected, which is undesirable.

In order to obtain the above effect, the lower limit value of Expression (14) is preferably any of 1.72, 1.74, and 1.76. The upper limit value of Expression (14) is preferably any of 2.10, 2.05, 2.00, 1.98, 1.96, and 1.94.

1-3-15. Expression (15)

$$-15.00 < (1-\beta n2t^2) \times \beta n2rt^2 < -1.10 \quad (15)$$

Here, $\beta n2t$ is a lateral magnification of the Gn2 group during infinity focus at the telephoto end, and $\beta n2rt$ is a synthesized lateral magnification of all groups on the image side from the Gn2 group during infinity focus at the telephoto end.

Expression (15) defines the play magnification of the Gn2 group during infinity focus at the telephoto end. By satisfying the range defined by Expression (15), it is possible to form a focusing group in which the amount of movement during focusing is small and the performance fluctuation is small.

When the value is less than the lower limit value of Expression (15), the play magnification of the Gn2 group becomes smaller than the proper value, and the refractive powers of the focusing group and all groups on the image side from the Gn2 group have to be made stronger than the proper value, which makes it difficult to suppress the performance fluctuation during focusing, which is not preferable. On the other hand, when the value exceeds the upper limit value of Expression (15), the play magnification of the Gn2 group becomes larger than the proper value, the amount of movement during focusing becomes large, and downsizing of the product becomes difficult, which is not preferable.

In order to obtain the above effect, the lower limit value of Expression (15) is preferably any of −12.00, −11.00, −10.00, −9.00, −7.00, −6.00, and −5.00. The upper limit value of Expression (15) is preferably any of −1.30, −1.50, −1.70, −1.90, and −2.00.

2. Imaging Device

Next, an imaging device according to the present invention will be described. An imaging device according to the present invention includes: the zoom lens according to the present invention; and an image sensor that is provided on an image side of the zoom lens and converts an optical image formed by the zoom lens into an electrical signal. Here, the image sensor and the like are not particularly limited, and a solid-state image sensor and the like such as a CCD sensor and a CMOS sensor can also be used, and the imaging device according to the present invention is suitable for an imaging device using these solid-state image sensors such as a digital camera and a video camera. Further, it is a matter of course that the imaging device may be a lens fixed type imaging device in which a lens is fixed to a housing, or may be a lens interchangeable type imaging device such as a single lens reflex camera or a mirrorless camera.

Figure 15:
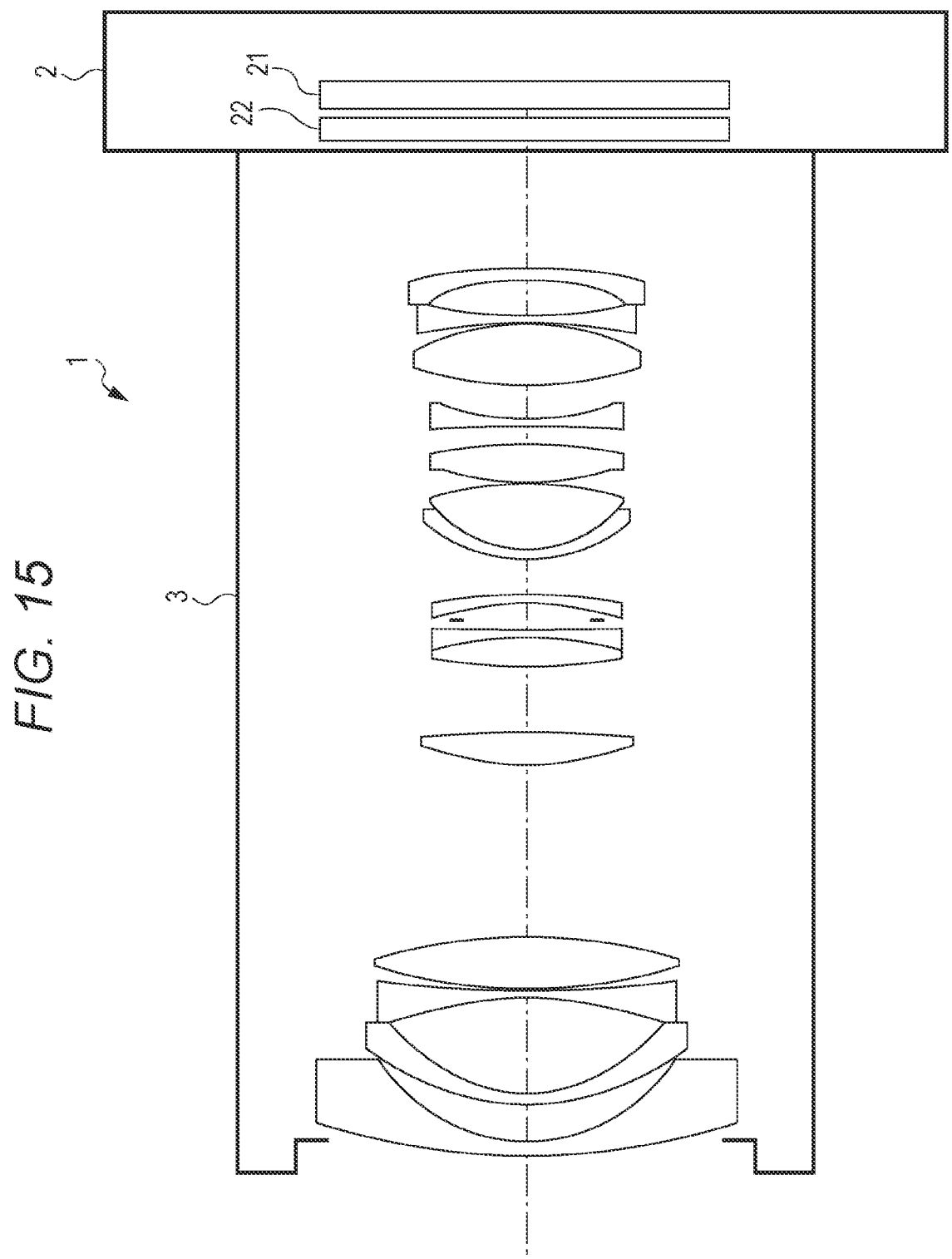
FIG. 15 is a diagram schematically illustrating an example of a configuration of an imaging device according to an embodiment of the present invention.

FIG. 15 is a diagram schematically illustrating an example of a configuration of an imaging device according to the present embodiment. As illustrated in FIG. 15, an imaging device 1 includes a camera 2 and a lens 3 detachable from the camera 2. The imaging device 1 is an aspect of an imaging device. The camera 2 includes a CCD sensor 21 and a cover glass 22 as image sensors. The CCD sensor 21 is disposed in the camera 2 at a position where the optical axis of the zoom lens in the lens 3 attached to the camera 2 is the central axis. The camera 2 may include an IR cut filter or the like instead of the cover glass 22.

Next, the present invention will be specifically described with reference to examples. However, the present invention is not limited to the following examples. The zoom lens according to each of the following examples is an imaging zoom lens used in an imaging device such as a digital camera, a video camera, or a silver-halide film camera. In the lens cross-sectional views (FIGS. 1, 3, 5, 7, 9, 11, and 13), the left side is the object side and the right side is the image side as viewed in the drawing.

Example 1

(1) Configuration of Zoom Lens

FIG. 1 is a lens cross-sectional view illustrating a configuration of a zoom lens according to Example 1 of the present invention. The zoom lens includes, in order from an object side to an image side, a first lens group G1 having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having positive refractive power as a whole.

In FIG. 1, "S" illustrated in the zoom lens is an aperture diaphragm, and "I" illustrated on an image side of the zoom lens is an image plane. Specifically, "S" indicates an imaging surface of a solid-state image sensor such as a CCD sensor or a CMOS sensor, or a film surface of a silver salt film. Since what is illustrated in these drawings is similar in other examples, the description thereof will be omitted below.

When zooming from the wide angle end to the telephoto end, the first lens group G1 moves from the object side to the image side along the optical axis, the Gp1 group moves from the image side to the object side, the Gn1 group moves from the object side to the image side, the Gp2 group moves from the image side to the object side, the Gn2 group moves from the image side to the object side, and the GL group moves from the image side to the object side. In addition, the Gp1 group and the Gp2 group move along the same trajectory.

During the focusing from the infinite-distance object to the proximity object, the Gn2 group moves along the optical axis.

The first lens group G1 includes a negative meniscus lens, a negative meniscus lens, a biconcave lens, and a biconvex lens in order from the object side to the image side.

The Gp1 group includes a biconvex lens and a cemented lens in which a biconvex lens and a biconcave lens are cemented in order from the object side to the image side.

The Gn1 group includes a negative meniscus lens.

The Gp2 group includes a cemented lens in which a negative meniscus lens and a biconvex lens are cemented, and a biconvex lens in order from the object side to the image side.

The Gn2 group includes a biconcave lens.

The GL group includes a biconvex lens, a biconcave lens, and a biconcave lens in order from the object side to the image side. Here, the biconvex lens is a positive lens GLp, and the two biconcave lenses are a negative lens GLn.

(2) Numerical Examples

Next, Numerical Example 1 to which specific numerical values of the zoom lens are applied will be described.

Table 1 shows lens data of the zoom lens. In Table 1, the surface No. represents the order of the lens surface counted from the object side, R represents the curvature radius of the lens surface, D represents the interval on the optical axis of the lens surface, Nd represents the refractive index with respect to line d (wavelength λ=587.6 nm), and vd represents the Abbe number with respect to line d (wavelength λ=587.6 nm). In addition, an aperture diaphragm S is indicated by adding S to the surface number. Further, in a case where the lens surface is an aspheric surface, * is indicated in the surface number, and a paraxial curvature radius is indicated in the field of the curvature radius R. In addition, the positive lens GLp and the negative lens GLn included in the GL group are illustrated. Table 2 shows an F value (Fno), a half angle of view (W), and a variable interval (D(n)) at each focal length of the zoom lens.

Table 3 shows the aspheric surface coefficient and the conic constant when the shape of the aspheric surface is expressed by the following expression. The aspheric surface is defined by the following expression. Here, c represents a curvature (1/R), h represents a height from the optical axis, k represents a conic coefficient, A4, A6, A8, A10 represent aspheric surface coefficients of each order.

$$z = ch^2/[1+\{1-(1+k)c^2h^2\}^{1/2}] + A4h^4 + A6h^6 + A8h^8 + A10h^{10}$$

Since the matters in these numerical examples are the same in other examples, the description thereof will be omitted below.

Figure 2:
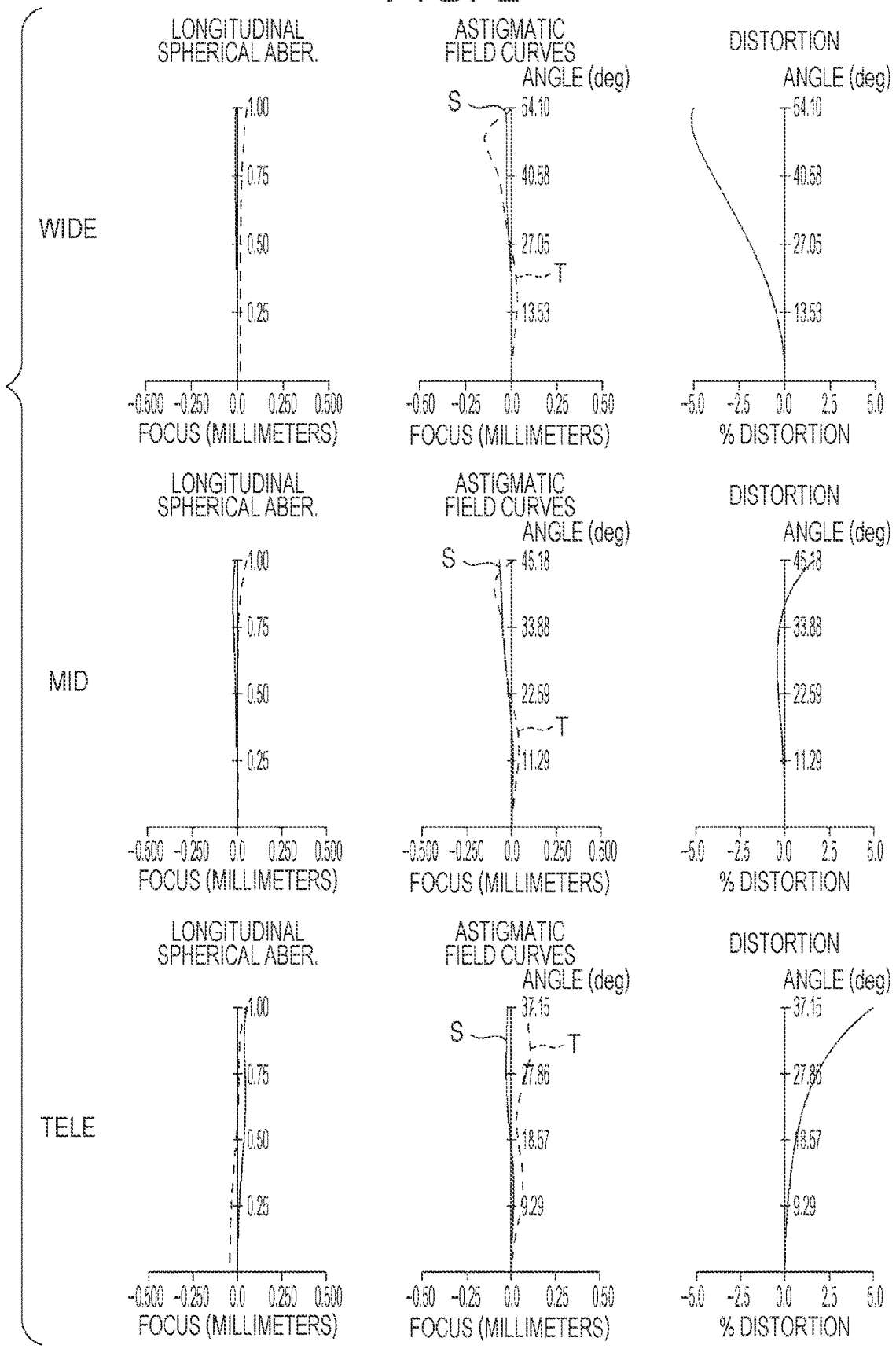
FIG. 2 is a spherical aberration diagram, an astigmatism diagram, and a distortion aberration diagram of the zoom lens according to Example 1 during infinity focus.

FIG. 2 is a longitudinal aberration diagram of the zoom lens during infinity focus. Each of the longitudinal aberration diagrams represents spherical aberration, astigmatism, and distortion in order from the left. In the diagram illustrating spherical aberration, a solid line represents line d (587.6 nm), and a broken line represents line g (435.8 nm). In the diagram illustrating the astigmatism, the solid line represents the sagittal direction (S) of line d, and the broken line represents the meridional direction (T) of line d. The order and arrangement of displaying these aberrations, and what is indicated by the solid line, the wavy line, and the like in each drawing are similar in other examples, and thus the description thereof will be omitted below.

The focal length of the lens group of each example and the numerical values of the Expressions (1) to (15) are shown in Table 22.

TABLE 1

| Surface No. | R | D | Nd | vd | |
|---|---|---|---|---|---|
| 1 | 75.315 | 1.500 | 1.87070 | 40.73 | |
| 2 | 18.685 | 4.046 | | | |
| 3* | 28.684 | 1.200 | 1.69350 | 53.20 | |
| 4* | 15.681 | 10.357 | | | |
| 5 | −39.950 | 0.800 | 1.59282 | 68.62 | |
| 6 | 106.311 | 0.200 | | | |
| 7 | 54.017 | 5.621 | 1.77047 | 29.74 | |
| 8 | −60.895 | D (8) | | | |
| 9 | 31.304 | 3.538 | 1.73037 | 32.23 | |
| 10 | −143.039 | 7.158 | | | |
| 11 | 68.546 | 3.181 | 1.43700 | 95.10 | |
| 12 | −36.989 | 0.800 | 2.00069 | 25.46 | |
| 13 | 438.443 | 1.095 | | | |
| 14S | 0.000 | D (14) | | | |
| 15 | −30.169 | 0.800 | 1.91082 | 35.25 | |
| 16 | −74.267 | D (16) | | | |
| 17 | 17.654 | 1.000 | 2.00100 | 29.13 | |
| 18 | 12.807 | 7.058 | 1.49700 | 81.61 | |
| 19 | −41.211 | 0.200 | | | |
| 20* | 28.448 | 4.182 | 1.59201 | 67.02 | |
| 21* | −49.212 | D (21) | | | |
| 22 | −125.116 | 0.800 | 1.91082 | 35.25 | |
| 23 | 27.205 | D (23) | | | |
| 24 | 43.396 | 6.574 | 1.92286 | 20.88 | GLp |
| 25 | −26.648 | 0.200 | | | |
| 26 | −48.780 | 0.800 | 2.00069 | 25.46 | GLn |
| 27 | 55.282 | 3.812 | | | |
| 28* | −68.449 | 1.251 | 1.85135 | 40.10 | GLn |
| 29* | 1315.390 | D (29) | | | |
| 30 | 0.000 | 2.500 | 1.51680 | 64.20 | |
| 31 | 0.000 | 1.000 | | | |

TABLE 2

| | Wide angle end | Intermediate region | Telephoto end |
|---|---|---|---|
| F | 16.483 | 21.154 | 27.168 |
| Fno | 2.910 | 2.910 | 2.910 |
| W | 54.102 | 45.177 | 37.149 |
| D(8) | 18.750 | 9.409 | 1.000 |
| D(14) | 1.811 | 3.620 | 4.826 |
| D(16) | 4.015 | 2.206 | 1.000 |
| D(21) | 2.001 | 2.699 | 3.872 |
| D(23) | 3.679 | 3.976 | 3.738 |
| D(29) | 13.855 | 17.311 | 21.540 |

TABLE 3

| Surface No. | k | A4 | A6 | A8 | A10 | A12 |
|---|---|---|---|---|---|---|
| 3 | −3.51116E+00 | 3.95184E−05 | −1.04764E−07 | 2.03466E−10 | 3.86021E−14 | −8.90845E−16 |
| 4 | −2.54287E−01 | 4.46040E−06 | −1.21409E−07 | −2.84872E−10 | 1.81562E−12 | −6.56251E−15 |
| 20 | 0.00000E+00 | −1.85267E−05 | −3.35761E−08 | −5.84711E−10 | −6.62524E−13 | −6.09434E−15 |
| 21 | 0.00000E+00 | 1.96468E−05 | −4.87985E−08 | −1.40021E−09 | 7.26759E−12 | −4.33117E−14 |
| 28 | 0.00000E+00 | −1.82953E−04 | 9.32881E−07 | −7.67804E−09 | 3.65908E−11 | −1.24204E−13 |
| 29 | 0.00000E+00 | −1.40663E−04 | 9.88945E−07 | −5.42555E−09 | 1.99451E−11 | −3.31357E−14 |

Example 2

(1) Configuration of Zoom Lens

Figure 3:
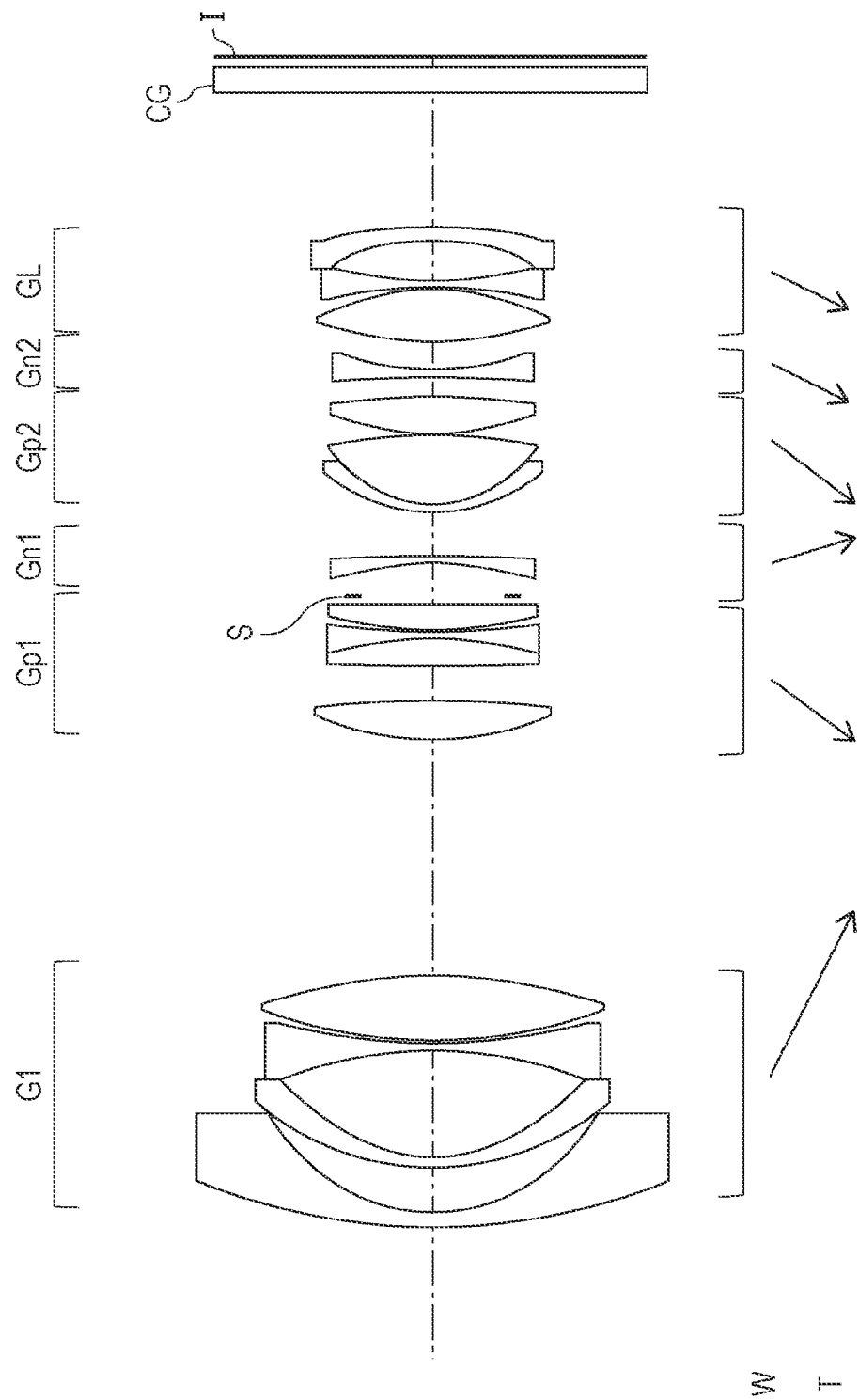
FIG. 3 is a cross-sectional view illustrating a lens configuration example of a zoom lens according to Example 2.

FIG. 3 is a lens cross-sectional view illustrating a configuration of a zoom lens according to Example 2 of the present invention. The zoom lens includes, in order from an object side to an image side, a first lens group G1 having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having positive refractive power as a whole.

When zooming from the wide angle end of the telephoto, the first lens group G1 moves from the object side to the image side along the optical axis, the Gp1 group moves from the image side to the object side, the Gn1 group moves from the object side to the image side, the Gp2 group moves from the image side to the object side, the Gn2 group moves from the image side to the object side, and the GL group moves from the image side to the object side. In addition, the Gp1 group and the Gp2 group move along the same trajectory.

During the focusing from the infinite-distance object to the proximity object, the Gn2 group moves along the optical axis.

The first lens group G1 includes a negative meniscus lens, a negative meniscus lens, a biconcave lens, and a biconvex lens in order from the object side to the image side.

The Gp1 group includes a biconvex lens, a cemented lens in which a biconvex lens and a biconcave lens are cemented, and a plano-convex lens in order from the object side to the image side.

The Gn1 group includes a negative meniscus lens.

The Gp2 group includes a cemented lens in which a negative meniscus lens and a biconvex lens are cemented, and a biconvex lens in order from the object side to the image side.

The Gn2 group includes a biconcave lens.

The GL group includes a biconvex lens, a biconcave lens, and a biconcave lens in order from the object side to the image side. Here, the biconvex lens is a positive lens GLp, and the two biconcave lenses are a negative lens GLn.

(2) Numerical Examples

Next, Numerical Example 2 to which specific numerical values of the zoom lens are applied will be described.

Figure 4:
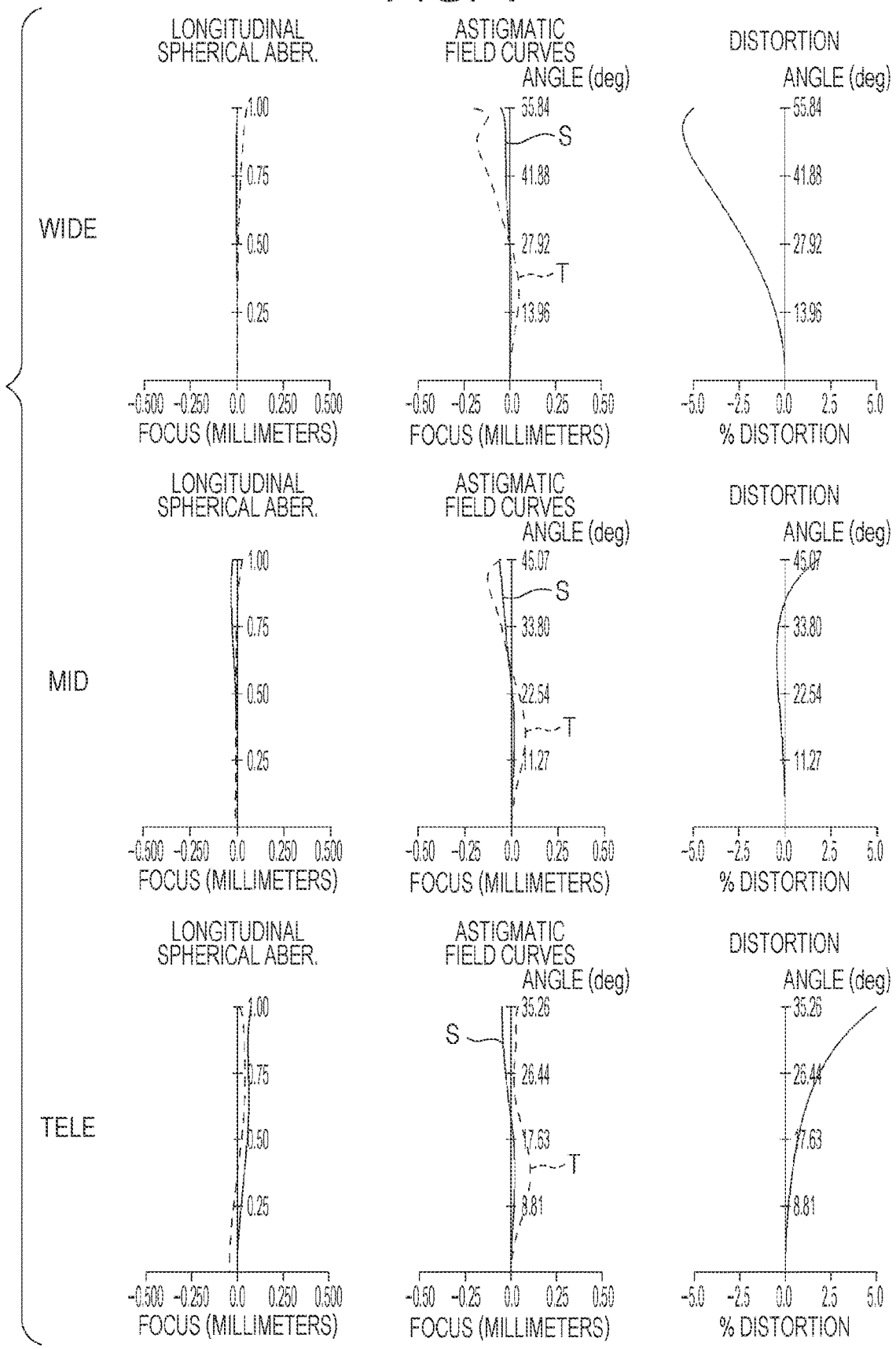
FIG. 4 is a spherical aberration diagram, an astigmatism diagram, and a distortion aberration diagram of the zoom lens according to Example 2 during infinity focus.

FIG. 4 is a longitudinal aberration diagram of the zoom lens during infinity focus.

TABLE 4

| Surface No. | R | D | Nd | vd | |
|---|---|---|---|---|---|
| 1 | 67.684 | 1.500 | 1.87070 | 40.73 | |
| 2 | 19.242 | 4.391 | | | |
| 3* | 28.804 | 1.200 | 1.69350 | 53.20 | |
| 4* | 16.289 | 10.830 | | | |
| 5 | −41.646 | 0.800 | 1.59282 | 68.62 | |
| 6 | 62.860 | 0.200 | | | |
| 7 | 48.315 | 6.598 | 1.73037 | 32.23 | |
| 8 | −54.140 | D (8) | | | |
| 9 | 30.419 | 3.943 | 1.75520 | 27.53 | |
| 10 | −114.973 | 3.588 | | | |
| 11 | 609.554 | 2.672 | 1.43700 | 95.10 | |
| 12 | −43.004 | 0.800 | 2.00069 | 25.46 | |
| 13 | 81.183 | 0.200 | | | |
| 14 | 44.977 | 2.524 | 1.61997 | 63.88 | |
| 15 | 0.000 | D (15) | | | |
| 16S | 0.000 | 3.189 | | | |
| 17 | −35.568 | 0.800 | 1.95375 | 32.32 | |
| 18 | −140.627 | D (18) | | | |
| 19 | 17.431 | 1.000 | 2.00069 | 25.46 | |
| 20 | 12.938 | 6.897 | 1.49700 | 81.61 | |
| 21 | −55.170 | 0.200 | | | |
| 22* | 26.343 | 3.671 | 1.61881 | 63.85 | |
| 23* | −70.075 | D (23) | | | |
| 24 | −144.890 | 0.800 | 1.91082 | 35.25 | |
| 25 | 25.920 | D (25) | | | |
| 26 | 37.682 | 5.228 | 1.92286 | 20.88 | GLp |
| 27 | −27.286 | 0.200 | | | |
| 28 | −52.223 | 0.800 | 2.00069 | 25.46 | GLn |
| 29 | 45.679 | 4.006 | | | |
| 30* | −71.422 | 1.344 | 1.85135 | 40.10 | GLn |
| 31* | 1030.011 | D (31) | | | |
| 32 | 0.000 | 2.500 | 1.51680 | 64.20 | |
| 33 | 0.000 | 1.000 | | | |

TABLE 5

| | Wide angle end | Intermediate region | Telephoto end |
|---|---|---|---|
| F | 15.451 | 21.205 | 29.100 |
| Fno | 2.910 | 2.910 | 2.991 |
| W | 55.841 | 45.071 | 35.258 |
| D(8) | 24.106 | 11.497 | 1.000 |
| D(15) | 1.000 | 2.845 | 4.362 |
| D(18) | 4.362 | 2.517 | 1.000 |
| D(23) | 1.999 | 2.447 | 3.578 |
| D(25) | 2.907 | 3.442 | 3.445 |
| D(31) | 13.768 | 18.493 | 24.224 |

TABLE 6

| Surface No. | k | A4 | A6 | A8 | A10 | A12 |
|---|---|---|---|---|---|---|
| 3 | −2.43315E+00 | 2.68966E−05 | −7.00337E−08 | 1.88812E−10 | −1.21497E−13 | −3.56905E−16 |
| 4 | −2.64495E−01 | 5.55140E−07 | −1.00886E−07 | −8.13545E−11 | 1.00415E−12 | −4.08886E−15 |
| 22 | 0.00000E+00 | −1.40215E−05 | −6.45599E−09 | −5.24081E−10 | 3.26115E−12 | −3.12121E−14 |
| 23 | 0.00000E+00 | 2.33066E−05 | −1.95881E−08 | −7.31914E−10 | 4.91914E−12 | −4.24454E−14 |
| 30 | 0.00000E+00 | −2.35630E−04 | 1.08544E−06 | −6.29397E−09 | 3.34135E−11 | −1.20870E−13 |
| 31 | 0.00000E+00 | −1.88067E−04 | 1.23142E−06 | −4.86586E−09 | 1.72347E−11 | −3.35190E−14 |

Example 3

(1) Configuration of Zoom Lens

Figure 5:
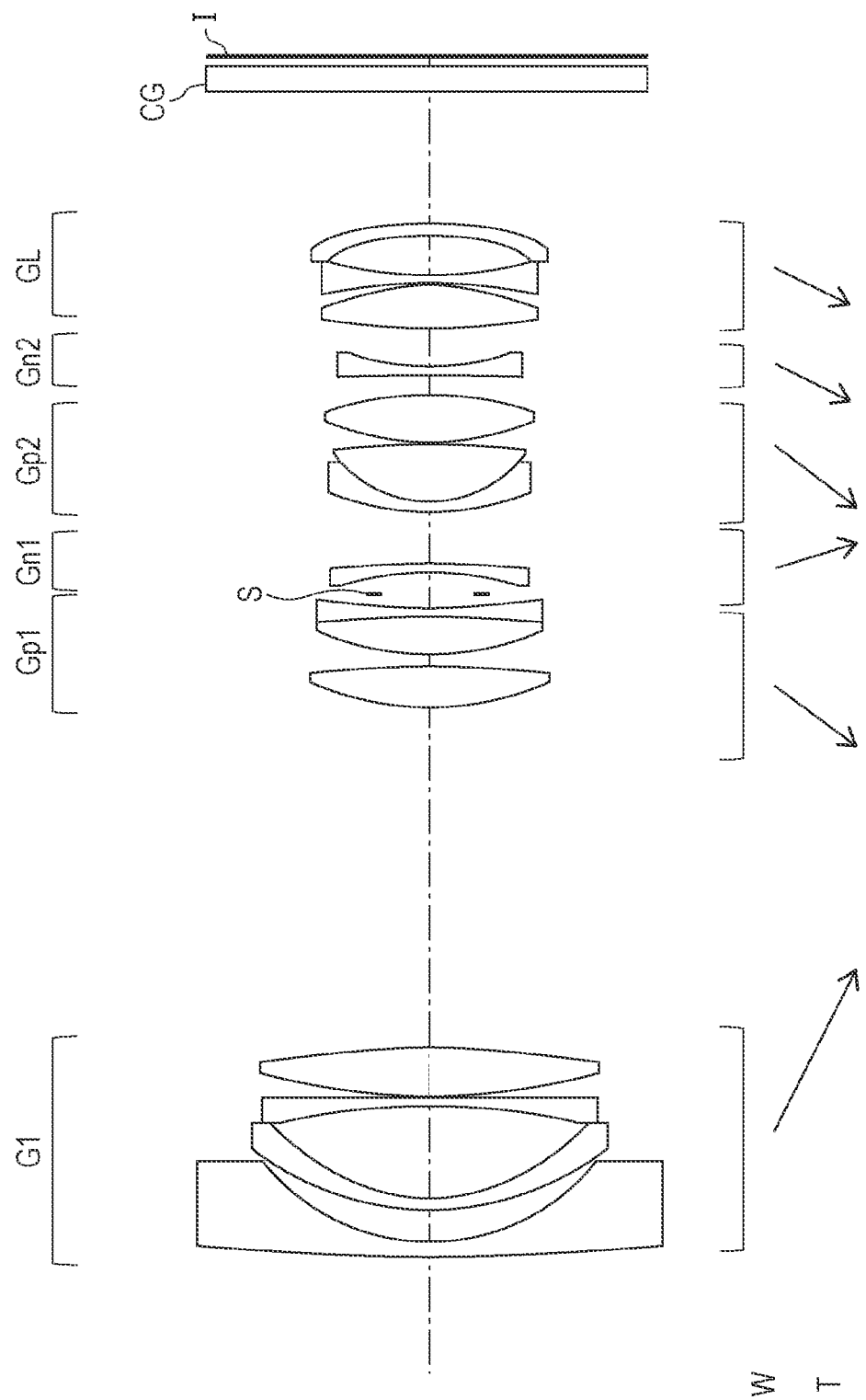
FIG. 5 is a cross-sectional view illustrating a lens configuration example of a zoom lens according to Example 3.

FIG. 5 is a lens cross-sectional view illustrating a configuration of a zoom lens according to Example 3 of the present invention. The zoom lens includes, in order from an object side to an image side, a first lens group having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having positive refractive power as a whole.

When zooming from the wide angle end of the telephoto, the first lens group G1 moves from the object side to the image side along the optical axis, the Gp1 group moves from the image side to the object side, the Gn1 group moves from the object side to the image side, the Gp2 group moves from the image side to the object side, the Gn2 group moves from the image side to the object side, and the GL group moves from the image side to the object side. In addition, the Gp1 group and the Gp2 group move along the same trajectory.

During the focusing from the infinite-distance object to the proximity object, the Gn2 group moves along the optical axis.

The first lens group G1 includes a negative meniscus lens, a negative meniscus lens, a biconcave lens, and a biconvex lens in order from the object side to the image side.

The Gp1 group includes a biconvex lens and a cemented lens in which a biconvex lens and a biconcave lens are cemented in order from the object side to the image side.

The Gn1 group includes a negative meniscus lens.

The Gp2 group includes a cemented lens in which a negative meniscus lens and a biconvex lens are cemented, and a biconvex lens in order from the object side to the image side.

The Gn2 group includes a biconcave lens.

The GL group includes a biconvex lens, a biconcave lens, and a negative meniscus lens in order from the object side to the image side. Here, the biconvex lens is a positive lens GLp, and the biconcave lens and the negative meniscus lens are a negative lens GLn.

(2) Numerical Examples

Next, Numerical Example 3 to which specific numerical values of the zoom lens are applied will be described.

Figure 6:
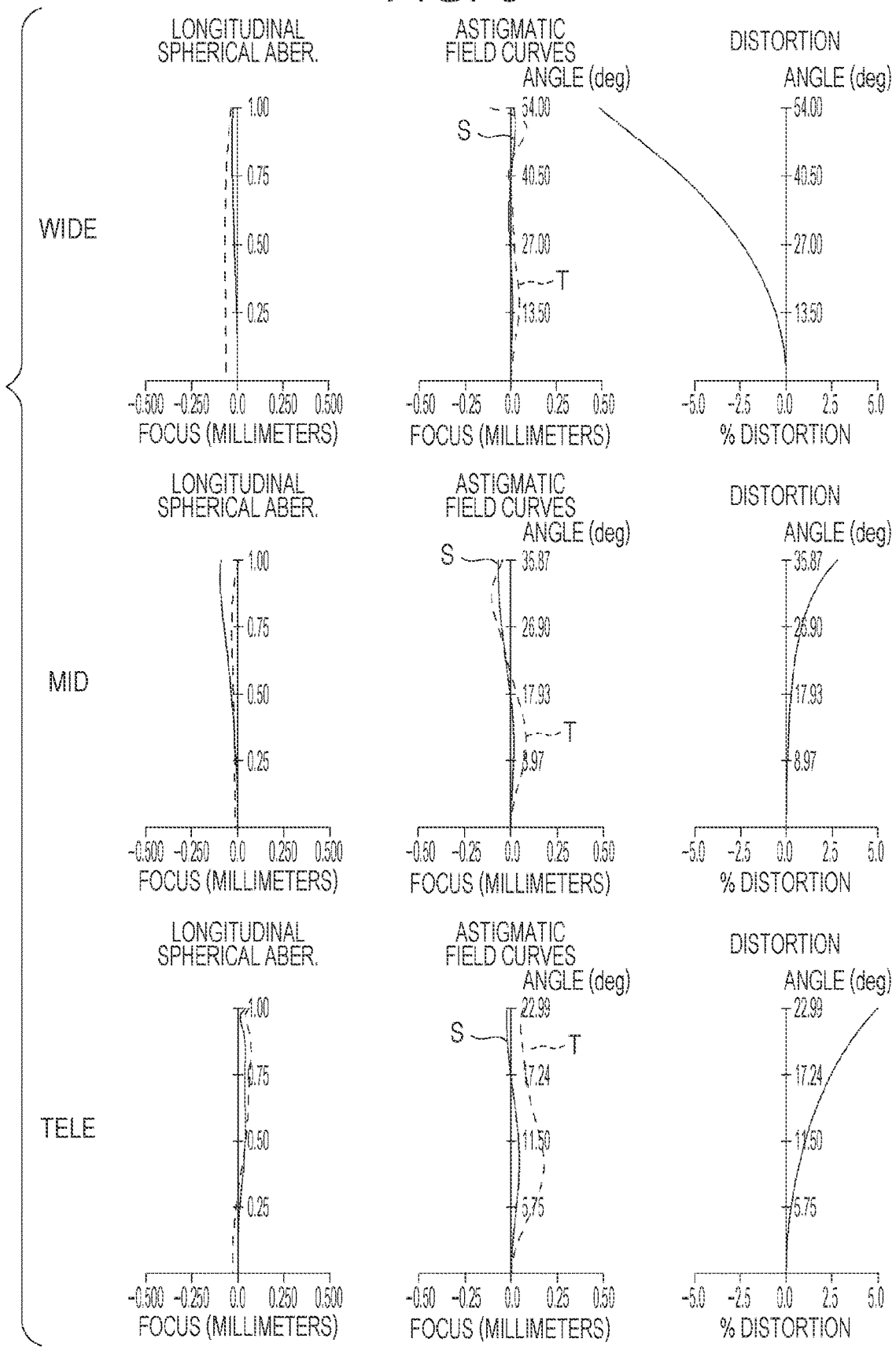
FIG. 6 is a spherical aberration diagram, an astigmatism diagram, and a distortion aberration diagram of the zoom lens of Example 3 during infinity focus.

FIG. 6 is a longitudinal aberration diagram of the zoom lens during infinity focus.

TABLE 7

| Surface No. | R | D | Nd | vd |
|---|---|---|---|---|
| 1 | 275.303 | 1.500 | 1.72916 | 54.67 |
| 2 | 21.808 | 3.337 | | |

TABLE 7-continued

| Surface No. | R | D | Nd | vd | |
|---|---|---|---|---|---|
| 3* | 30.995 | 1.200 | 1.69350 | 53.20 | |
| 4* | 18.012 | 9.487 | | | |
| 5 | −68.965 | 0.800 | 1.77250 | 49.62 | |
| 6 | 1207.329 | 0.200 | | | |
| 7 | 64.521 | 4.899 | 1.73037 | 32.23 | |
| 8 | −98.338 | D (8) | | | |
| 9 | 30.306 | 4.184 | 1.68893 | 31.16 | |
| 10 | −107.010 | 1.270 | | | |
| 11 | 29.369 | 3.916 | 1.61800 | 63.39 | |
| 12 | −109.369 | 0.800 | 2.00100 | 29.13 | |
| 13 | 57.158 | D (13) | | | |
| 14S | 0.000 | 2.414 | | | |
| 15* | −28.584 | 0.800 | 1.87070 | 40.73 | |
| 16 | −110.624 | D (16) | | | |
| 17 | 28.007 | 1.000 | 1.95375 | 32.32 | |
| 18 | 12.017 | 5.913 | 1.59282 | 68.62 | |
| 19 | −83.123 | 0.200 | | | |
| 20* | 24.109 | 4.940 | 1.61881 | 63.85 | |
| 21* | −33.573 | D (21) | | | |
| 22 | −171.483 | 0.800 | 1.95375 | 32.32 | |
| 23 | 24.394 | D (23) | | | |
| 24 | 63.824 | 4.419 | 1.92286 | 20.88 | GLp |
| 25 | −26.531 | 0.200 | | | |
| 26 | −50.610 | 0.800 | 1.95375 | 32.32 | GLn |
| 27 | 39.132 | 4.072 | | | |
| 28* | −134.365 | 1.200 | 1.85135 | 40.10 | GLn |
| 29* | −909.265 | D (29) | | | |
| 30 | 0.000 | 2.500 | 1.51680 | 64.20 | |
| 31 | 0.000 | 1.000 | | | |

TABLE 8

| | Wide angle end | Intermediate region | Telephoto end |
|---|---|---|---|
| F | 17.515 | 29.145 | 48.508 |
| Fno | 4.120 | 4.120 | 4.141 |
| W | 54.004 | 35.867 | 22.990 |
| D(8) | 34.997 | 15.146 | 1.000 |
| D(13) | 1.361 | 3.441 | 5.670 |
| D(16) | 5.309 | 3.228 | 1.000 |
| D(21) | 2.054 | 2.199 | 3.507 |
| D(23) | 3.929 | 5.882 | 6.559 |
| D(29) | 13.500 | 22.103 | 34.624 |

TABLE 9

| Surface No. | k | A4 | A6 | A8 | A10 | A12 |
|---|---|---|---|---|---|---|
| 3 | −1.28583E+00 | 1.60900E−05 | −5.27720E−08 | 2.31297E−10 | −6.20250E−13 | 5.735118−16 |
| 4 | −2.71204E−01 | −1.25960E−06 | −9.12418E−08 | 2.75633E−10 | −1.06841E−12 | 8.62699E−16 |
| 15 | 0.00000E+00 | 1.46320E−05 | −5.82008E−08 | 3.04752E−10 | −1.43865E−12 | 6.93293E−26 |
| 20 | 0.00000E+00 | −2.12241E−05 | −9.21986E−09 | 7.94531E−10 | −1.66169E−11 | 8.49590E−14 |
| 21 | 0.00000E+00 | 1.25800E−05 | −1.93654E−07 | 1.01152E−09 | −1.834130E−11 | 7.28746E−14 |
| 28 | 0.00000E+00 | −2.14708E−04 | 6.30784E−07 | −8.89048E−09 | 6.687860E−11 | −1.24425E−13 |
| 29 | 0.00000E+00 | −1.87918E−04 | 7.04343E−07 | −6.01436E−09 | 4.524520E−11 | −9.60495E−14 |

Example 4

(1) Configuration of Zoom Lens

Figure 7:
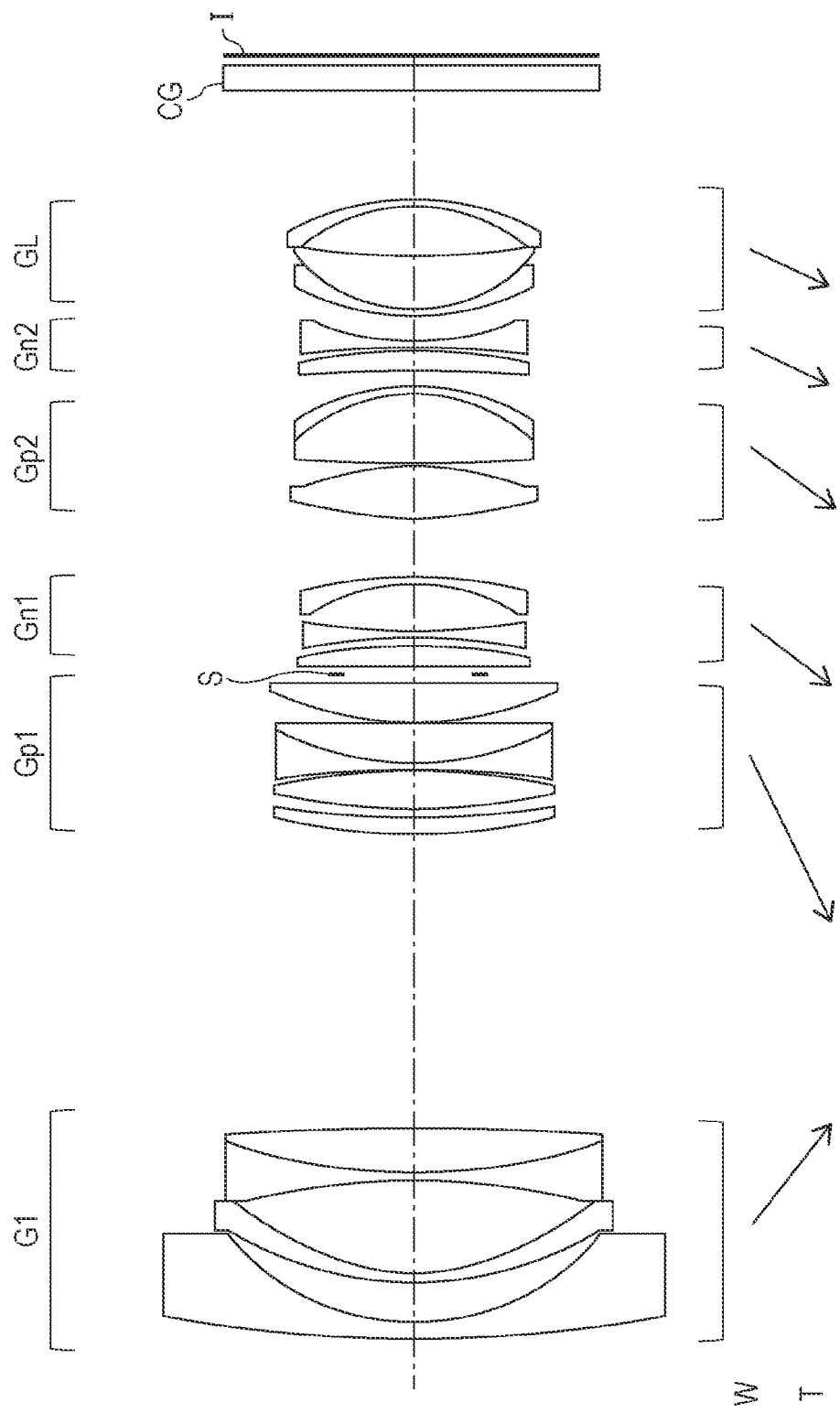
FIG. 7 is a cross-sectional view illustrating a lens configuration example of a zoom lens according to Example 4.

FIG. 7 is a lens cross-sectional view illustrating a configuration of a zoom lens according to Example 4 of the present invention. The zoom lens includes, in order from an object side to an image side, a first lens group G1 having negative refractive power and a subsequent group. The subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having negative refractive power as a whole. The zoom lens performs zooming by changing an interval between the lens groups.

When zooming from the wide angle end of the telephoto, the first lens group G1 moves from the object side to the image side along the optical axis, the Gp1 group moves from the image side to the object side, the Gn1 group moves from the image side to the object side, the Gp2 group moves from the image side to the object side, the Gn2 group moves from the image side to the object side, and the GL group moves from the image side to the object side. In addition, the Gp2 group and the GL group move along the same trajectory.

During the focusing from the infinite-distance object to the proximity object, the Gn2 group moves along the optical axis.

The first lens group G1 includes a negative meniscus lens, a negative meniscus lens, and a cemented lens in which a biconcave lens and a biconvex lens are cemented in order from the object side to the image side.

The Gp1 group includes a positive meniscus lens, a biconvex lens, a cemented lens in which a biconcave lens and a biconvex lens are cemented, and a plano-convex lens in order from the object side to the image side.

The Gn1 group includes a negative meniscus lens, a biconcave lens, and a negative meniscus lens in order from the object side to the image side.

The Gp2 group includes a biconvex lens and a cemented lens in which the biconvex lens and the negative meniscus lens are cemented in order from the object side to the image side.

The Gn2 group includes a positive meniscus lens and a biconcave lens in order from the object side to the image side.

The GL group includes, in order from the object side to the image side, a cemented lens in which a negative meniscus lens and a positive meniscus lens are cemented, and a negative meniscus lens. Here, the negative meniscus lens is the negative lens GLn.

(2) Numerical Examples

Next, Numerical Example 4 to which specific numerical values of the zoom lens are applied will be described.

Figure 8:
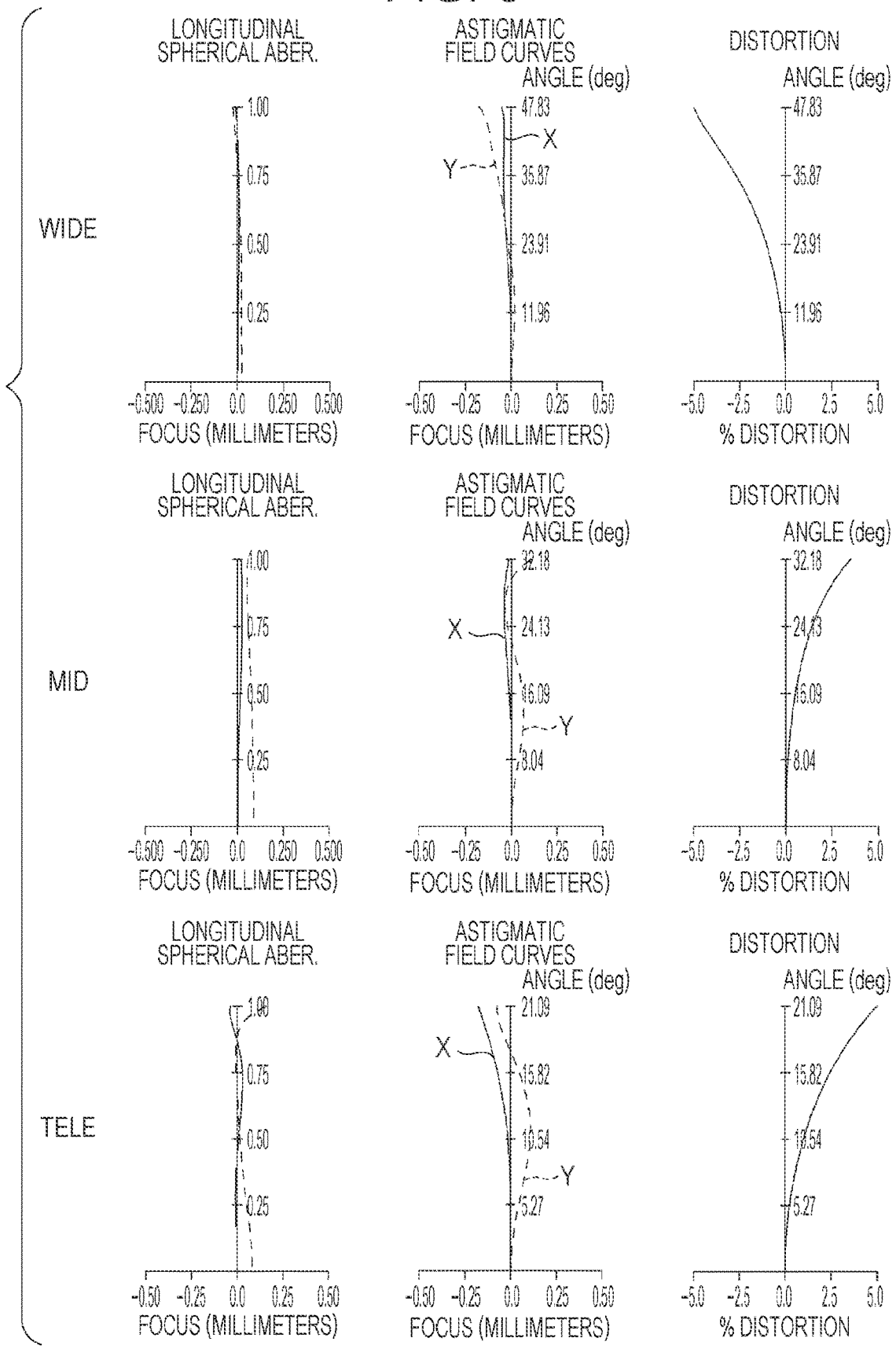
FIG. 8 is a spherical aberration diagram, an astigmatism diagram, and a distortion aberration diagram of the zoom lens of Example 4 during infinity focus.

FIG. 8 is a longitudinal aberration diagram of the zoom lens during infinity focus.

TABLE 10

| Surface No. | R | D | Nd | vd | |
|---|---|---|---|---|---|
| 1 | 168.421 | 2.000 | 1.72916 | 54.67 | |
| 2 | 28.362 | 4.840 | | | |
| 3* | 41.856 | 1.200 | 1.69350 | 53.20 | |
| 4* | 26.046 | 11.311 | | | |
| 5 | −82.296 | 0.800 | 1.43700 | 95.10 | |
| 6 | 68.463 | 5.450 | 2.00100 | 29.13 | |
| 7 | −321.166 | D (7) | | | |
| 8 | 63.832 | 2.131 | 1.92286 | 20.88 | |
| 9 | 100.694 | 1.052 | | | |
| 10 | 71.569 | 4.522 | 1.72916 | 54.67 | |
| 11 | −83.275 | 0.200 | | | |
| 12 | −122.989 | 0.800 | 2.00069 | 25.46 | |
| 13 | 35.749 | 4.814 | 1.59282 | 68.62 | |
| 14 | −4132.498 | 0.200 | | | |
| 15 | 40.536 | 4.625 | 1.72916 | 54.67 | |
| 16 | 0.000 | D (16) | | | |
| 17S | 0.000 | 1.066 | | | |
| 18 | −1206.241 | 2.457 | 1.94595 | 17.98 | |
| 19 | −70.546 | 1.000 | | | |
| 20* | −58.521 | 0.800 | 1.69350 | 53.20 | |
| 21* | 80.114 | 5.727 | | | |
| 22 | −22.528 | 0.800 | 1.87070 | 40.73 | |
| 23 | −58.665 | D (23) | | | |
| 24* | 40.248 | 6.301 | 1.61881 | 63.85 | |
| 25* | −30.824 | 0.200 | | | |
| 26 | 151.784 | 8.607 | 1.55032 | 75.50 | |
| 27 | −20.057 | 0.800 | 2.00100 | 29.13 | |
| 28 | −26.563 | D (28) | | | |
| 29 | −212.879 | 2.500 | 1.94595 | 17.98 | |
| 30 | −62.330 | 0.296 | | | |
| 31 | −102.952 | 0.800 | 1.80420 | 46.50 | |
| 32 | 29.660 | D (32) | | | |
| 33 | 30.202 | 0.800 | 1.95375 | 32.32 | GLn |
| 34 | 17.974 | 6.465 | 1.59349 | 67.00 | |
| 35 | 90.359 | 5.905 | | | |
| 36 | −21.290 | 0.800 | 1.69680 | 55.46 | GLn |
| 37 | −31.233 | D (37) | | | |
| 38 | 0.000 | 2.500 | 1.51680 | 64.20 | |
| 39 | 0.000 | 1.000 | | | |

TABLE 11

| | Wide angle end | Intermediate region | Telephoto end |
|---|---|---|---|
| F | 20.596 | 33.148 | 53.345 |
| Fno | 2.913 | 2.913 | 2.913 |
| W | 47.829 | 32.178 | 21.087 |
| D(7) | 35.517 | 15.071 | 1.000 |
| D(16) | 1.000 | 7.814 | 17.975 |
| D(23) | 7.164 | 4.514 | 1.000 |
| D(28) | 1.944 | 1.002 | 1.537 |
| D(32) | 3.108 | 4.050 | 3.515 |
| D(37) | 13.500 | 21.787 | 31.615 |

TABLE 12

| Surface No. | k | A4 | A6 | A8 | A10 | A12 |
|---|---|---|---|---|---|---|
| 3 | 0.00000E+00 | 1.02910E−05 | −4.81984E−08 | 9.11528E−11 | −9.01652E−14 | 3.07113E−17 |
| 4 | 0.00000E+00 | 3.74711E−06 | −5.91313E−08 | 7.85838E−11 | −5.00756E−14 | −4.05707E−17 |
| 20 | 0.00000E+00 | 1.36212E−05 | −9.21288E−08 | 4.24191E−10 | −3.69489E−13 | −1.63945E−15 |
| 21 | 0.00000E+00 | 8.59121E−06 | −7.02374E−08 | 2.05865E−10 | 9.26405E−13 | −4.69778E−15 |
| 24 | 0.00000E+00 | −1.63110E−05 | 2.89176E−08 | −4.83430E−12 | −3.06801E−13 | 1.50822E−15 |
| 25 | 0.00000E+00 | 1.42534E−05 | −4.44084E−10 | 1.15503E−10 | −6.36647E−13 | 2.03056E−15 |

Example 5

(1) Configuration of Zoom Lens

Figure 9:
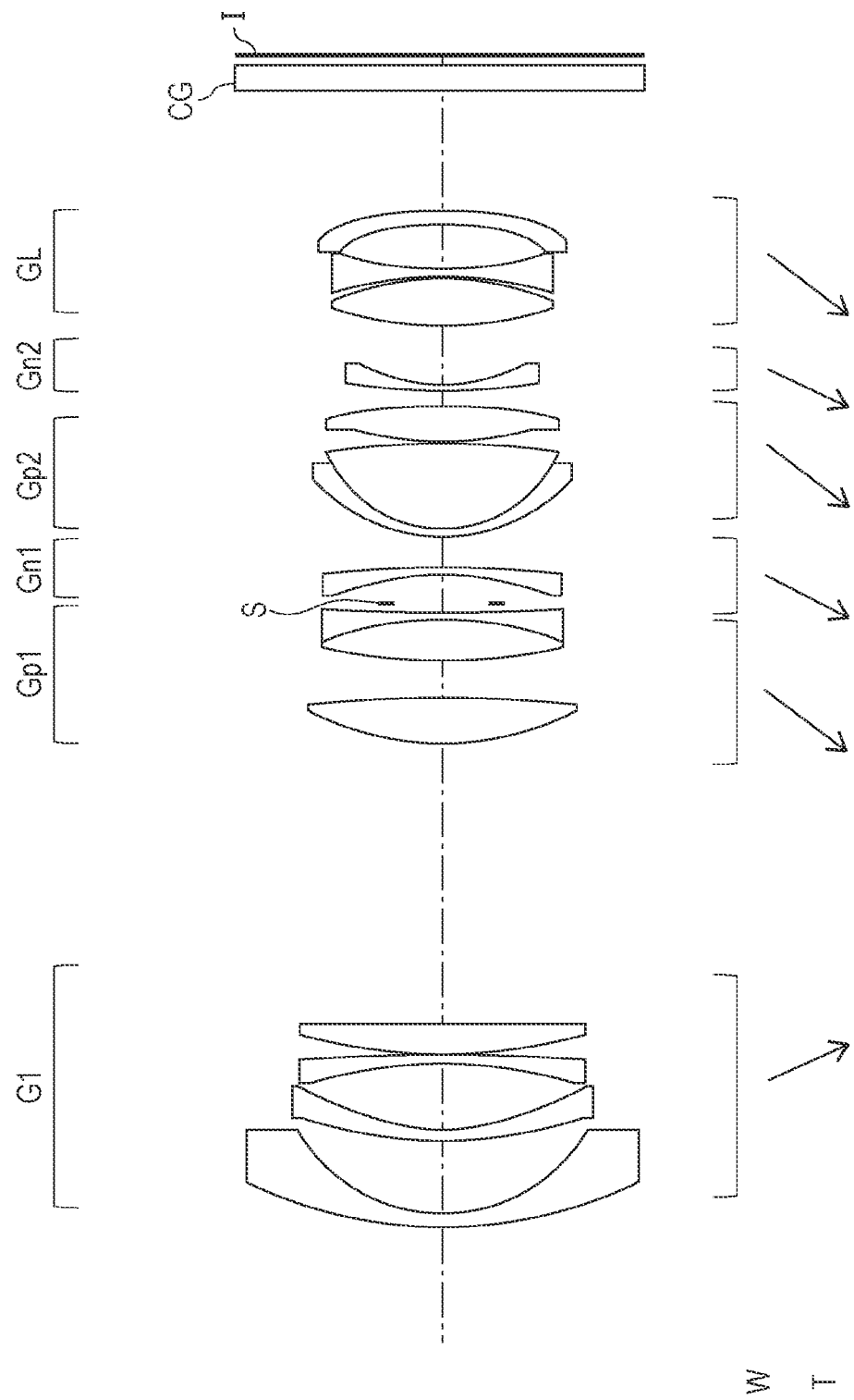
FIG. 9 is a cross-sectional view illustrating a lens configuration example of a zoom lens according to Example 5.

FIG. 9 is a lens cross-sectional view illustrating a configuration of a zoom lens according to Example 5 of the present invention. The zoom lens includes, in order from an object side to an image side, a first lens group G1 having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having negative refractive power as a whole.

When zooming from the wide angle end of the telephoto, the first lens group G1 moves from the object side to the image side along the optical axis, the Gp1 group moves from the image side to the object side, the Gn1 group moves from the image side to the object side, the Gp2 group moves from the image side to the object side, the Gn2 group moves from the image side to the object side, and the GL group moves from the image side to the object side. In addition, the Gp1 group, the Gp2 group, and the GL group move along the same trajectory.

During the focusing from the infinite-distance object to the proximity object, the Gn2 group moves along the optical axis.

The first lens group G1 includes a negative meniscus lens, a negative meniscus lens, a negative meniscus lens, and a positive meniscus lens in order from the object side to the image side.

The Gp1 group includes a biconvex lens and a cemented lens in which a biconcave lens and a biconvex lens are cemented in order from the object side to the image side.

The Gn1 group includes a negative meniscus lens.

The Gp2 group includes a cemented lens in which a negative meniscus lens and a biconvex lens are cemented, and a biconvex lens in order from the object side to the image side.

The Gn2 group includes a negative meniscus lens.

The GL group includes a biconvex lens, a biconcave lens, and a biconcave lens in order from the object side to the image side. Here, the biconvex lens is a positive lens GLp, and the two biconcave lenses are a negative lens GLn.

(2) Numerical Examples

Next, Numerical Example 5 to which specific numerical values of the zoom lens are applied will be described.

Figure 10:
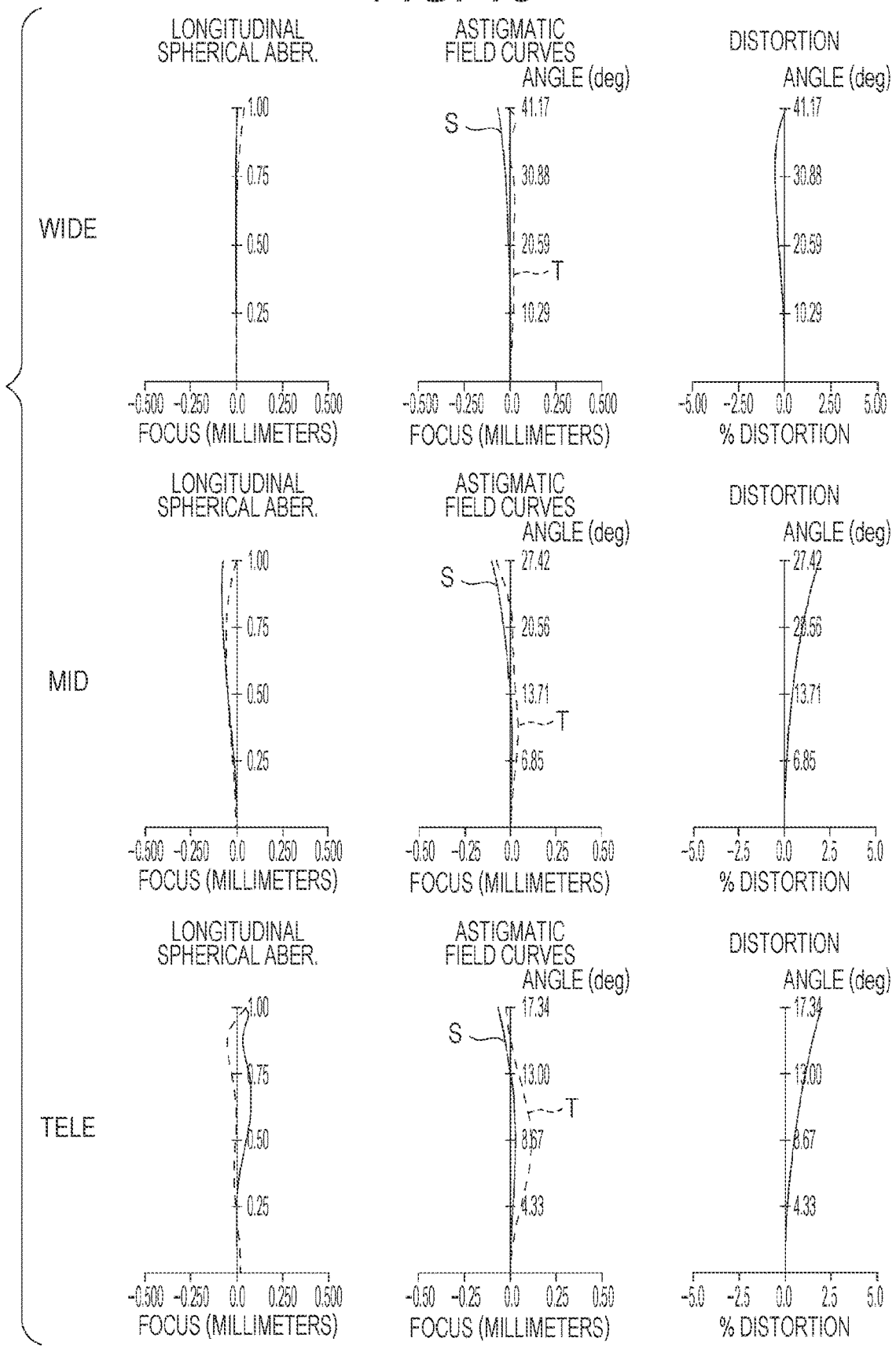
FIG. 10 is a spherical aberration diagram, an astigmatism diagram, and a distortion aberration diagram of the zoom lens of Example 5 during infinity focus.

FIG. 10 is a longitudinal aberration diagram of

TABLE 13

| Surface No. | R | D | Nd | vd | |
|---|---|---|---|---|---|
| 1 | 50.374 | 1.500 | 1.59349 | 67.00 | |
| 2 | 18.579 | 8.113 | | | |
| 3* | 45.943 | 1.200 | 1.49700 | 81.61 | |
| 4* | 22.380 | 7.341 | | | |
| 5 | −51.066 | 0.820 | 1.59282 | 68.62 | |
| 6 | −345.053 | 0.244 | | | |
| 7 | 63.201 | 3.203 | 1.95375 | 32.32 | |
| 8 | 1000.893 | D (8) | | | |
| 9 | 30.745 | 5.100 | 1.68960 | 31.14 | |
| 10 | −168.312 | 4.106 | | | |
| 11 | 59.588 | 4.617 | 1.49700 | 81.61 | |
| 12 | −38.979 | 0.800 | 2.00069 | 25.46 | |
| 13 | 213.844 | D (13) | | | |
| 14S | 0.000 | 3.123 | | | |
| 15* | −30.675 | 0.800 | 1.90366 | 31.31 | |
| 16 | −131.701 | D (16) | | | |
| 17 | 19.183 | 1.000 | 1.91082 | 35.25 | |
| 18 | 14.014 | 9.298 | 1.55032 | 75.50 | |
| 19 | −100.709 | 0.200 | | | |
| 20* | 27.292 | 4.020 | 1.61881 | 63.85 | |
| 21* | −97.271 | D (21) | | | |
| 22 | 63.634 | 0.800 | 1.77250 | 49.62 | |
| 23 | 19.641 | D (23) | | | |
| 24 | 38.598 | 5.262 | 1.84666 | 23.78 | GLp |
| 25 | −31.216 | 0.200 | | | |
| 26 | −37.670 | 0.800 | 1.91082 | 35.25 | GLn |
| 27 | 37.811 | 4.947 | | | |
| 28* | −74.953 | 1.500 | 1.76802 | 49.24 | GLn |
| 29* | 1041.727 | D (29) | | | |
| 30 | 0.000 | 2.500 | 1.51680 | 64.20 | |
| 31 | 0.000 | 1.000 | | | |

TABLE 14

| | Wide angle end | Intermediate region | Telephoto end |
|---|---|---|---|
| F | 24.718 | 40.975 | 67.922 |
| Fno | 4.100 | 4.100 | 4.100 |
| W | 41.172 | 27.417 | 17.337 |
| D (8) | 31.298 | 13.434 | 1.000 |
| D (13) | 1.088 | 2.469 | 3.528 |
| D (16) | 3.440 | 2.060 | 1.000 |
| D (21) | 1.654 | 1.767 | 2.812 |
| D (23) | 6.527 | 6.413 | 5.368 |
| D (29) | 13.500 | 26.462 | 46.224 |

TABLE 14

| | Wide angle end | Intermediate region | Telephoto end |
|---|---|---|---|
| F | 24.718 | 40.975 | 67.922 |
| Fno | 4.100 | 4.100 | 4.100 |
| W | 41.172 | 27.417 | 17.337 |
| D(8) | 31.298 | 13.434 | 1.000 |
| D(13) | 1.088 | 2.469 | 3.528 |
| D(16) | 3.440 | 2.060 | 1.000 |
| D(21) | 1.654 | 1.767 | 2.812 |

TABLE 14-continued

|  | Wide angle end | Intermediate region | Telephoto end |
|---|---|---|---|
| D(23) | 6.527 | 6.413 | 5.368 |
| D(29) | 13.500 | 26.462 | 46.224 |

Example 6

(1) Configuration of Zoom Lens

Figure 11:
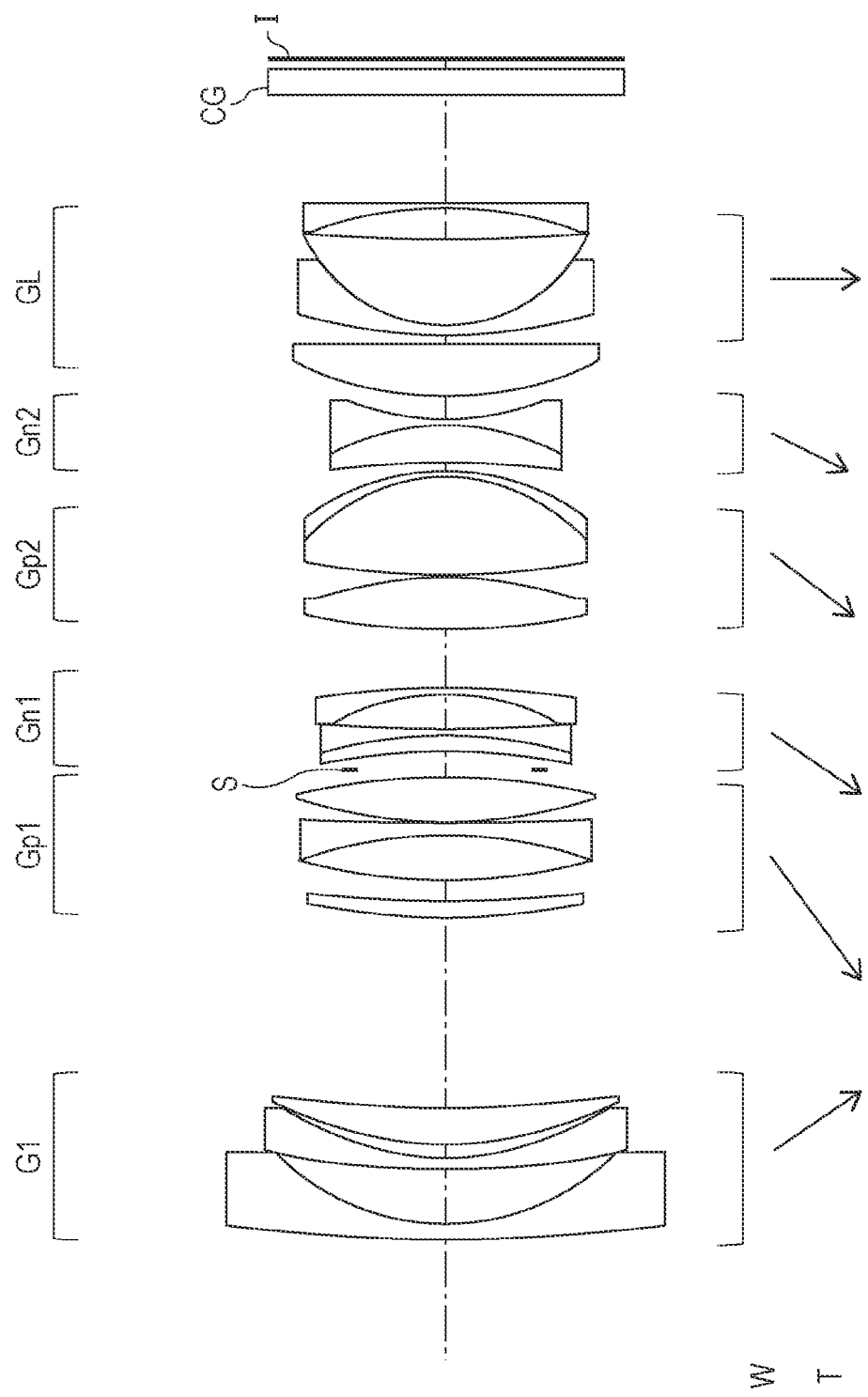
FIG. 11 is a cross-sectional view illustrating a lens configuration example of a zoom lens of Example 6.

FIG. 11 is a lens cross-sectional view showing a configuration of a zoom lens of Example 6 according to the present invention. The zoom lens includes, in order from an object side to an image side, a first lens group having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having positive refractive power as a whole.

When zooming from the wide angle end of the telephoto, the first lens group G1 moves from the object side to the image side along the optical axis, the Gp1 group moves from the image side to the object side, the Gn1 group moves from the image side to the object side, the Gp2 group moves from the image side to the object side, and the Gn2 group moves from the image side to the object side.

During the focusing from the infinite-distance object to the proximity object, the Gn2 group moves along the optical axis.

The first lens group G1 includes a negative meniscus lens, a negative meniscus lens, and a positive meniscus lens in order from the object side to the image side.

The Gp1 group includes a positive meniscus lens, a cemented lens in which a biconvex lens and a biconcave lens are cemented, and a biconvex lens in order from the object side to the image side.

The Gn1 group includes a cemented lens in which a positive meniscus lens and a biconcave lens are cemented and a negative meniscus lens in order from the object side to the image side.

The Gp2 group includes a biconvex lens and a cemented lens in which the biconvex lens and the negative meniscus lens are cemented in order from the object side to the image side.

The Gn2 group includes a cemented lens in which a positive meniscus lens and a biconcave lens are cemented in order from the object side to the image side.

The GL group includes, in order from the object side to the image side, a biconvex lens, a cemented lens in which a negative meniscus lens and a positive meniscus lens are cemented, and a plano-concave lens. Here, the biconvex lens is a positive lens GLp, and the biconcave lens and the plano-concave lens are a negative lens GLn.

(2) Numerical Examples

Next, Numerical Example 6 to which specific numerical values of the zoom lens are applied will be described.

Figure 12:
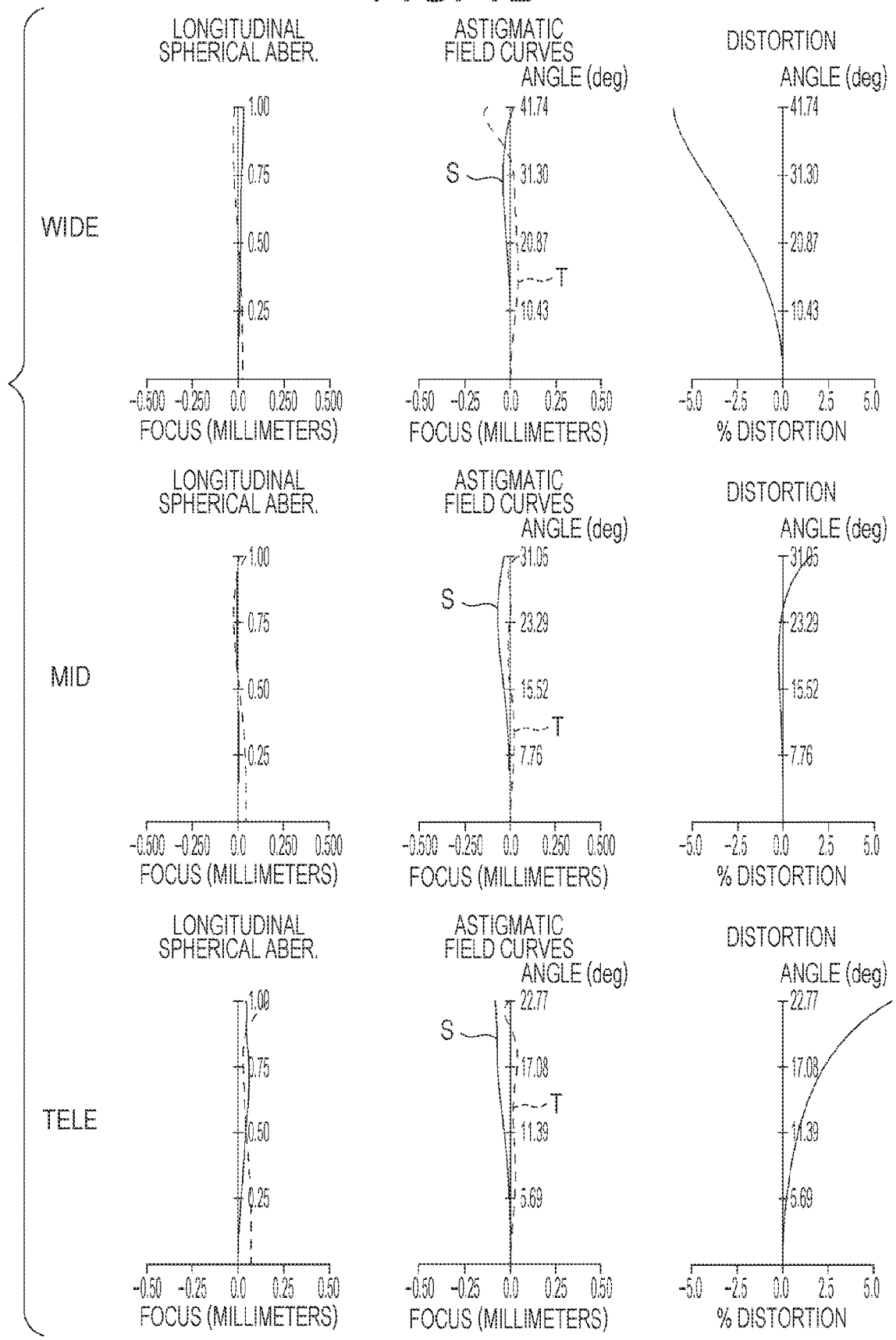
FIG. 12 is a spherical aberration diagram, an astigmatism diagram, and a distortion aberration diagram of the zoom lens of Example 6 during infinity focus.

FIG. 12 is a longitudinal aberration diagram of the zoom lens during infinity focus.

TABLE 16

| Surface No. | R | D | Nd | vd | |
|---|---|---|---|---|---|
| 1 | 211.606 | 2.000 | 1.69680 | 55.46 | |
| 2 | 30.100 | 7.019 | | | |
| 3* | 135.962 | 1.500 | 1.59201 | 67.02 | |
| 4* | 33.342 | 1.772 | | | |
| 5 | 48.195 | 4.613 | 1.92119 | 23.96 | |
| 6 | 151.562 | D (6) | | | |
| 7 | 89.065 | 2.068 | 1.72916 | 54.67 | |
| 8 | 164.533 | 2.775 | | | |
| 9 | 78.039 | 5.645 | 1.49700 | 81.61 | |
| 10 | −57.292 | 1.500 | 1.85478 | 24.80 | |
| 11 | 331.746 | 0.200 | | | |
| 12 | 60.491 | 5.739 | 1.72916 | 54.67 | |
| 13 | −88.808 | D (13) | | | |
| 14S | 0.000 | 2.293 | | | |
| 15 | −84.485 | 2.123 | 1.92286 | 20.88 | |
| 16 | −54.984 | 0.800 | 1.75500 | 52.32 | |
| 17 | 199.518 | 4.461 | | | |
| 18 | −29.701 | 0.800 | 1.69680 | 55.46 | |
| 19 | −107.492 | D (19) | | | |
| 20* | 78.018 | 6.816 | 1.76802 | 49.24 | |
| 21* | −42.832 | 0.200 | | | |
| 22 | 90.748 | 12.591 | 1.49700 | 81.61 | |
| 23 | −23.690 | 0.800 | 2.00100 | 29.13 | |
| 24 | −29.753 | D (24) | | | |
| 25 | −114.286 | 4.849 | 1.92286 | 20.88 | |
| 26 | −31.961 | 0.800 | 1.74077 | 27.76 | |
| 27 | 34.568 | D (27) | | | |
| 28 | 45.204 | 6.744 | 1.92286 | 20.88 | GLp |
| 29 | −1645.879 | 1.112 | | | |
| 30 | 69.370 | 1.201 | 1.85478 | 24.80 | GLn |
| 31 | 20.030 | 11.090 | 1.59282 | 68.62 | |
| 32 | 246.231 | 3.908 | | | |
| 33* | −50.354 | 0.800 | 1.69895 | 30.05 | GLn |
| 34 | 0.000 | D (34) | | | |
| 35 | 0.000 | 2.500 | 1.51680 | 64.20 | |
| 36 | 0.000 | 1.000 | | | |

TABLE 17

|  | Wide angle end | Intermediate region | Telephoto end |
|---|---|---|---|
| F | 25.754 | 35.344 | 48.493 |
| Fno | 2.060 | 2.060 | 2.060 |
| W | 41.735 | 31.049 | 22.775 |
| D(6) | 24.459 | 12.310 | 3.764 |
| D(13) | 1.000 | 8.274 | 16.208 |
| D(19) | 7.382 | 4.306 | 1.000 |
| D(24) | 0.995 | 2.580 | 4.895 |
| D(27) | 2.944 | 8.120 | 15.359 |
| D(34) | 13.500 | 13.500 | 13.556 |

TABLE 18

| Surface No. | k | A4 | A6 | A8 | A10 | A12 |
|---|---|---|---|---|---|---|
| 3 | 0.00000E+00 | 2.21752E−06 | −4.89582E−09 | 1.47094E−11 | −1.95149E−14 | 8.00285E−18 |
| 4 | 0.00000E+00 | −2.79969E−06 | −8.18423E−09 | 1.12447E−11 | −1.37216E−14 | −4.64367E−18 |
| 20 | 0.00000E+00 | −5.34305E−06 | 1.13979E−08 | −8.78809E−12 | 2.46977E−14 | 1.38035E−16 |
| 21 | 0.00000E+00 | 5.27908E−06 | 6.79943E−09 | 1.92029E−11 | −6.70208E−14 | 3.06102E−16 |
| 33 | 0.00000E+00 | −2.54128E−06 | 1.66629E−08 | −1.27269E−10 | 4.15270E−13 | −5.25754E−16 |

Example 7

(1) Configuration of Zoom Lens

Figure 13:
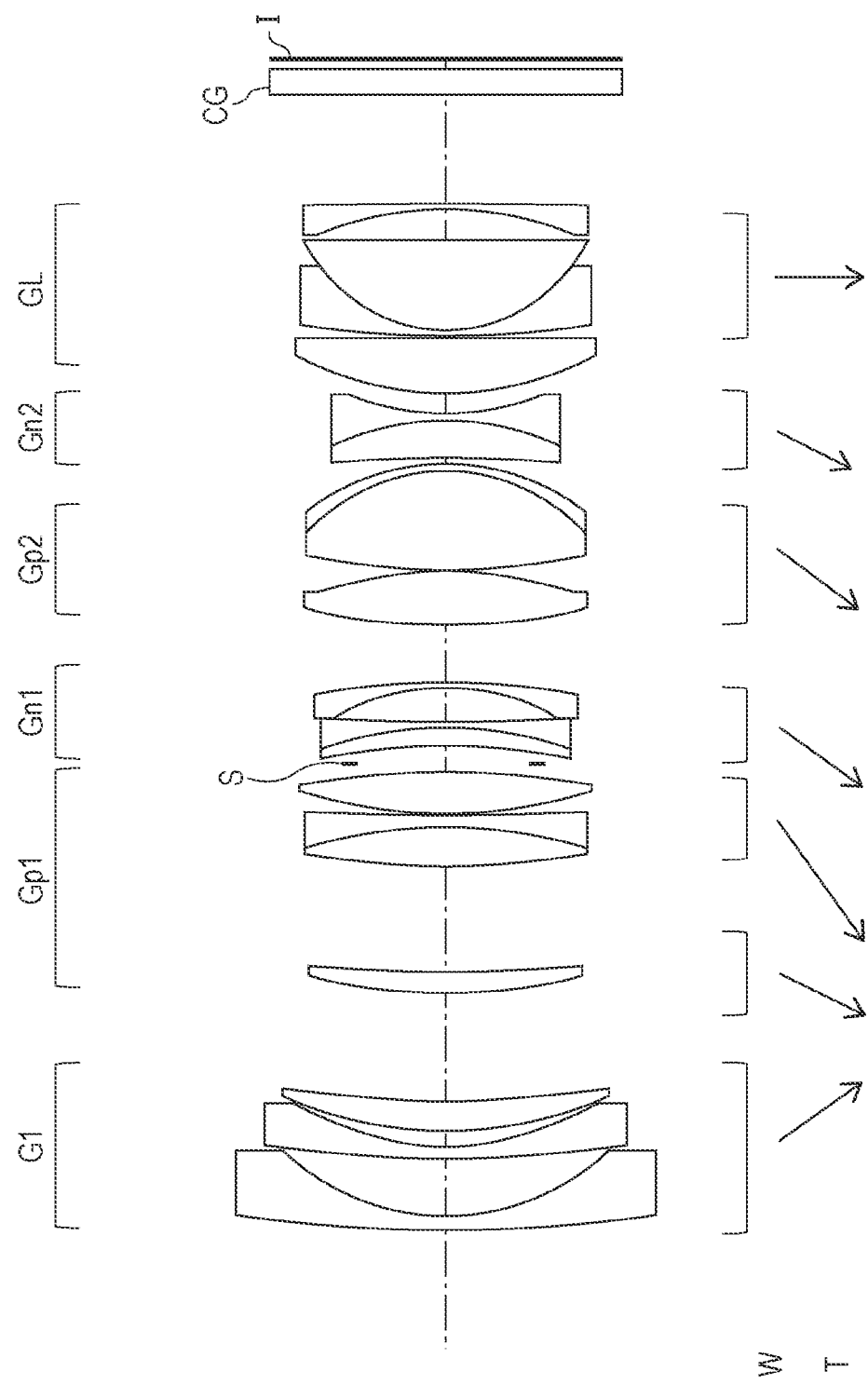
FIG. 13 is a cross-sectional view illustrating a lens configuration example of a zoom lens of Example 7.

FIG. 13 is a lens cross-sectional view showing a configuration of a zoom lens of Example 7 according to the present invention. The zoom lens includes, in order from an object side to an image side, a first lens group having negative refractive power and a subsequent group, and the subsequent group includes, in order from the object side to the image side, a Gp1 group having positive refractive power as a whole, a Gn1 group having negative refractive power as a whole, a Gp2 group having positive refractive power as a whole, a Gn2 group having negative refractive power as a whole, and a GL group having positive refractive power as a whole.

When zooming from the wide angle end of the telephoto, the first lens group G1 moves from the object side to the image side along the optical axis, a part of the Gp1 group moves from the image side to the object side, a part of the Gp1 group moves from the image side to the object side, the Gn1 group moves from the image side to the object side, the Gp2 group moves from the image side to the object side, and the Gn2 group moves from the image side to the object side.

During the focusing from the infinite-distance object to the proximity object, the Gn2 group moves along the optical axis.

The first lens group G1 includes a negative meniscus lens, a negative meniscus lens, a negative meniscus lens, and a positive meniscus lens in order from the object side to the image side.

The Gp1 group includes a positive meniscus lens, a cemented lens in which a biconvex lens and a biconcave lens are cemented, and a biconvex lens in order from the object side to the image side.

The Gn1 group includes a cemented lens in which a positive meniscus lens and a biconcave lens are cemented and a negative meniscus lens in order from the object side to the image side.

The Gp2 group includes a biconvex lens and a cemented lens in which the biconvex lens and the negative meniscus lens are cemented in order from the object side to the image side.

The Gn2 group includes a cemented lens in which a positive meniscus lens and a biconcave lens are cemented in order from the object side to the image side.

The GL group includes, in order from the object side to the image side, a biconvex lens, a cemented lens in which a negative meniscus lens and a positive meniscus lens are cemented, and a negative meniscus lens. Here, the biconvex lens is the positive lens GLp, and the two negative meniscus lenses are the negative lens GLn.

(2) Numerical Examples

Next, Numerical Example 7 to which specific numerical values of the zoom lens are applied will be described.

Figure 14:
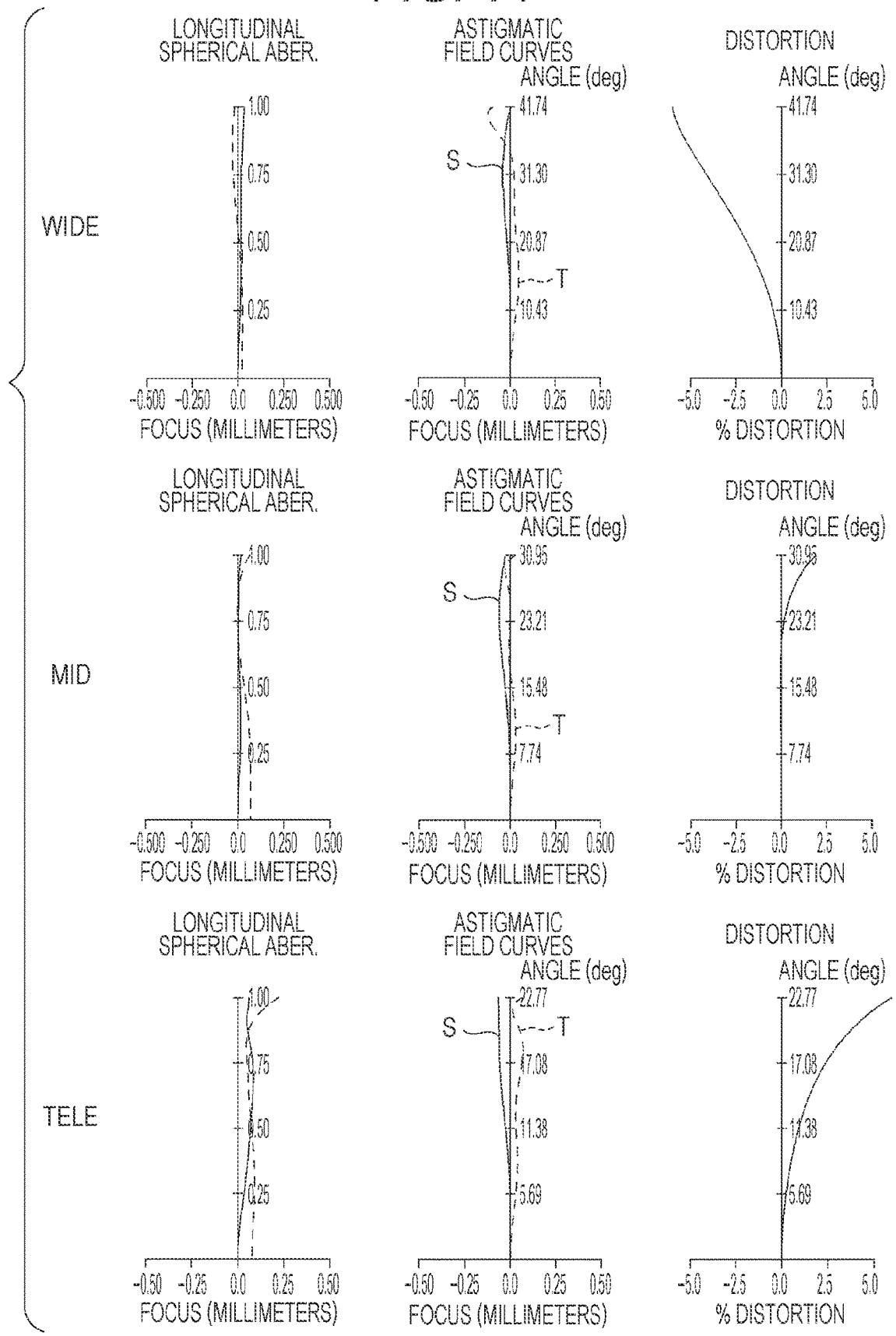
FIG. 14 is a spherical aberration diagram, an astigmatism diagram, and a distortion aberration diagram of the zoom lens of Example 7 during infinity focus.

FIG. 14 is a longitudinal aberration diagram of the zoom lens during infinity focus.

TABLE 19

| Surface No. | R | D | Nd | νd | |
|---|---|---|---|---|---|
| 1 | 176.082 | 2.000 | 1.69680 | 55.46 | |
| 2 | 30.526 | 7.420 | | | |
| 3* | 193.559 | 1.500 | 1.59201 | 67.02 | |
| 4* | 33.175 | 2.001 | | | |
| 5 | 52.125 | 3.911 | 1.92119 | 23.96 | |
| 6 | 125.412 | D (6) | | | |
| 7 | 69.678 | 2.742 | 1.72916 | 54.67 | |
| 8 | 218.115 | D (8) | | | |
| 9 | 92.784 | 5.196 | 1.49700 | 81.61 | |
| 10 | −62.201 | 1.500 | 1.85478 | 24.80 | |
| 11 | 382.434 | 0.200 | | | |
| 12 | 62.470 | 5.384 | 1.72916 | 54.67 | |
| 13 | −101.865 | D (13) | | | |
| 14S | 0.000 | 2.503 | | | |
| 15 | −72.562 | 2.217 | 1.92286 | 20.88 | |
| 16 | −48.087 | 0.800 | 1.75500 | 52.32 | |
| 17 | 333.518 | 4.325 | | | |
| 18 | −29.488 | 0.800 | 1.69680 | 55.46 | |
| 19 | −85.770 | D (19) | | | |
| 20* | 79.738 | 6.975 | 1.76802 | 49.24 | |
| 21* | −42.170 | 0.200 | | | |
| 22 | 86.600 | 12.791 | 1.49700 | 81.61 | |
| 23 | −23.814 | 0.800 | 2.00100 | 29.13 | |
| 24 | −29.753 | D (24) | | | |
| 25 | −134.967 | 4.783 | 1.92286 | 20.88 | |
| 26 | −33.413 | 0.800 | 1.74077 | 27.76 | |
| 27 | 33.277 | D (27) | | | |
| 28 | 40.878 | 7.183 | 1.92286 | 20.88 | GLp |
| 29 | −1155.712 | 0.200 | | | |
| 30 | 129.986 | 0.800 | 1.85478 | 24.80 | GLn |
| 31 | 19.937 | 11.583 | 1.59282 | 68.62 | |
| 32 | 2651.060 | 3.972 | | | |
| 33* | −45.737 | 0.800 | 1.69895 | 30.05 | GLn |
| 34 | −451.930 | 13.500 | | | |
| 35 | 0.000 | 2.500 | 1.51680 | 64.20 | |
| 36 | 0.000 | 1.000 | | | |

TABLE 20

| | Wide angle end | Intermediate region | Telephoto end |
|---|---|---|---|
| F | 25.755 | 35.344 | 48.499 |
| Fno | 2.060 | 2.060 | 2.060 |
| W | 41.735 | 30.951 | 22.768 |
| D(6) | 13.951 | 7.074 | 3.622 |
| D(8) | 13.616 | 7.995 | 1.000 |
| D(13) | 1.000 | 9.974 | 18.619 |
| D(19) | 7.359 | 4.196 | 1.000 |
| D(24) | 0.995 | 2.328 | 4.228 |
| D(27) | 2.695 | 8.077 | 15.813 |

TABLE 21

| Surface No. | k | A4 | A6 | A8 | A10 | A12 |
|---|---|---|---|---|---|---|
| 3 | 0.00000E+00 | 1.89114E−06 | −7.62216E−09 | 2.19032E−11 | −3.03917E−14 | 1.48874E−17 |
| 4 | 0.00000E+00 | −3.32251E−06 | −1.13576E−08 | 2.09250E−11 | −2.89821E−14 | 6.84090E−18 |
| 20 | 0.00000E+00 | −5.19503E−06 | 1.23791E−08 | −6.41621E−12 | 2.20603E−14 | 1.49674E−16 |
| 21 | 0.00000E+00 | 5.71700E−06 | 6.43525E−09 | 3.17122E−11 | −1.03244E−13 | 3.71157E−16 |
| 33 | 0.00000E+00 | −2.55132E−06 | 1.92557E−08 | −1.43013E−10 | 4.78900E−13 | −5.95364E−16 |

TABLE 22

|  | Example 1 | Example 2 | Example 3 | Example 4 | Example 5 | Example 6 | Example 7 |
|---|---|---|---|---|---|---|---|
| f1 | −23.728 | −25.127 | −27.790 | −43.480 | −37.635 | −50.995 | −42.730 |
| f2 | 47.329 | 44.323 | 31.660 | 45.585 | 48.885 | 49.037 | 139.331 |
| f3 | −56.269 | −50.105 | −44.468 | −31.364 | −44.419 | −33.678 | 63.247 |
| f4 | 17.701 | 18.227 | 19.274 | 20.691 | 19.793 | 24.653 | −35.830 |
| f5 | −24.473 | −24.085 | −22.347 | −41.394 | −37.070 | −41.409 | 24.478 |
| f6 | 136.360 | 126.346 | 482.155 | −280.750 | −140.663 | 105.681 | −41.757 |
| f7 | — | — | — | — | — | — | 130.376 |
| Expression (1) | 2.30 | 2.08 | 1.99 | 0.76 | 1.20 | 0.81 | 2.58 |
| Expression (2) | 1.08 | 1.50 | 1.94 | 1.68 | 1.23 | 0.80 | 0.89 |
| Expression (3) | 6.90 | 7.70 | 7.02 | 7.53 | 5.26 | 5.82 | 5.82 |
| Expression (4) | 2.67 | 2.43 | 1.64 | 2.20 | 2.47 | 1.99 | 1.85 |
| Expression (5) | −1.34 | −1.38 | −1.44 | −2.10 | −1.90 | −2.07 | −1.75 |
| Expression (6) | 2.87 | 2.87 | 1.81 | 2.21 | 1.98 | 1.90 | 1.76 |
| Expression (7) | 1.07 | 1.18 | 1.10 | 1.00 | 0.80 | 0.96 | 0.95 |
| Expression (8) | −1.48 | −1.56 | −1.28 | −2.01 | −1.50 | −1.61 | −1.62 |
| Expression (9) | 2.70 | 6.12 | 3.03 | 2.21 | 13.08 | 1.81 | 1.90 |
| Expression (10) | 1.81 | 2.11 | 5.07 | 1.54 | 2.02 | 1.40 | 1.39 |
| Expression (11) | 1.25 | 1.38 | 1.57 | 1.24 | 1.34 | 1.11 | 1.12 |
| Expression (12) | 0.92 | 0.88 | 0.95 | 1.07 | 1.23 | 1.00 | 1.00 |
| Expression (13) | 1.92 | 1.92 | 1.92 | 1.59 | 1.85 | 1.92 | 1.92 |
| Expression (14) | 1.93 | 1.93 | 1.90 | 1.83 | 1.84 | 1.78 | 1.78 |
| Expression (15) | −4.51 | −4.94 | −9.70 | −4.39 | −8.95 | −2.34 | −2.49 |

Summary

A zoom lens according to a first aspect of the present invention includes: a first lens group having negative refractive power and a subsequent group in order from an object side to an image side. The subsequent group includes, in order from an object side to an image side, a Gp1 group including one or more lens groups and having positive refractive power as a whole, a Gn1 group including one or more lens groups and having negative refractive power as a whole, a Gp2 group including one or more lens groups and having positive refractive power as a whole, and a Gn2 group including one or more lens groups and having negative refractive power as a whole. An aperture diaphragm is disposed closer to an object side than the Gp2 group, an interval between adjacent lens groups changes at least during one of zooming and focusing, and the following expression is satisfied.

$$0.40 < fn1/fn2 < 3.55 \quad (1)$$

$$0.50 < (m1 - mp1)/fw < 2.30 \quad (2)$$

$$1.00 < Lw/fw < 9.00 \quad (3)$$

Here,
fn1 is a focal length of the Gn1 group during infinity focus at a telephoto end,
fn2 is a focal length of the Gn2 group during infinity focus at a telephoto end,
m1 is an amount of movement of the first lens group during infinity focus when zooming from a wide angle end to a telephoto end,
mp1 is an amount of movement of the Gp1 group during infinity focus during zooming from a wide angle end to a telephoto end,
Lw is a total optical length of the zoom lens during infinity focus at a wide angle end, and
fw is a focal length of the zoom lens during infinity focus at a wide angle end.

A zoom lens according to a second aspect of the present invention may satisfy the following expression in the first aspect.

$$0.10 < fp1/fp2 < 10.00 \quad (4)$$

Here,
fp1 is a focal length of the Gp1 group during infinity focus at the telephoto end, and
fp2 is a focal length of the Gp2 group during infinity focus at the telephoto end.

A zoom lens according to a third aspect of the present invention may satisfy the following expression in the first aspect or the second aspect.

$$-5.00 < f1/fp2 < -0.10 \quad (5)$$

Here,
f1 is a focal length of the first lens group, and
fp2 is a focal length of the Gp2 group during infinity focus at the telephoto end.

A zoom lens according to a fourth aspect of the present invention may satisfy the following expression in the first to third aspects.

$$1.00 < fp1/fw < 10.00 \quad (6)$$

Here,
fp1 is a focal length of the Gp1 group during infinity focus at the telephoto end.

A zoom lens according to a fifth aspect of the present invention may satisfy the following expression in the first to fourth aspects.

$$0.50 < fp2/fw < 8.00 \quad (7)$$

Here,
fp2 is a focal length of the Gp2 group during infinity focus at the telephoto end.

A zoom lens according to a sixth aspect of the present invention may satisfy the following expression in the first to fifth aspects.

$$-8.00 < fn2/fw < -1.00 \quad (8)$$

A zoom lens according to a seventh aspect of the present invention may satisfy the following expression in the first to sixth aspects.

$$1.00 < |\beta p1t/\beta p1w| < 20.00 \quad (9)$$

Here,
$\beta p1t$ is a lateral magnification of the Gp1 group during infinity focus at a telephoto end, and βp1w is a lateral magnification of the Gp1 group during infinity focus at a wide angle end.

A zoom lens according to an eighth aspect of the present invention may satisfy the following expression in the first to seventh aspects.

$$1.00<|\beta p2t/\beta p2w|<15.00 \tag{10}$$

Here,

βp2t is a lateral magnification of the Gp2 group during infinity focus at the telephoto end, and βp2w is a lateral magnification of the Gp2 group during infinity focus at the wide angle end.

A zoom lens according to a ninth aspect of the present invention may satisfy the following expression in the first to eighth aspects.

$$1.00<|\beta n2t/\beta n2w|<10.00 \tag{11}$$

Here,

βn2t is a lateral magnification of the Gn2 group during infinity focus at the telephoto end, and βn2w is a lateral magnification of the Gn2 group during infinity focus at the wide angle end.

In the zoom lens according to a tenth aspect of the present invention, in the first to ninth aspects, the GL group may be disposed closest to an image side, and satisfy the following expression.

$$0.50<|\beta Lt/\beta Lw|<10.00 \tag{12}$$

Here,

βLt is a lateral magnification of the GL group during infinity focus at the telephoto end, and βLw is a lateral magnification of the GL group during infinity focus at the wide angle end.

In a zoom lens according to an eleventh aspect of the present invention, a GL group including one or more lens groups may be disposed closest to an image side, and the GL group may include a positive lens GLp closest to an object side in the first to tenth aspects.

In a zoom lens according to a twelfth aspect of the present invention, the following expression may be satisfied in the eleventh aspect.

$$1.80<ndLp<2.20 \tag{13}$$

Here, ndLp is a refractive index at line d of the positive lens GLp.

In a zoom lens according to a thirteenth aspect of the present invention, a GL group including one or more lens groups may be disposed closest to an image side, the GL group may include at least one or more negative lenses GLn, and the following expression may be satisfied in the first aspect to the twelfth aspect.

$$1.70<ndLnave<2.20 \tag{14}$$

Here, ndLnave is an average value of refractive indexes of the negative lenses GLn included in the GL group at line d.

In a zoom lens according to a fourteenth aspect of the present invention, in the first to thirteenth aspects, the Gn2 group may move on an optical axis during focusing.

A zoom lens according to a fifteenth aspect of the present invention may satisfy the following expression in the first to fourteenth aspects.

$$-15.00<(1-\beta n2t^2)\times\beta n2rt^2<-1.10 \tag{15}$$

Here,

βn2t is a lateral magnification of the Gn2 group during infinity focus at the telephoto end, and βn2rt is a synthesized lateral magnification of all groups on the image side with respect to the Gn2 group during infinity focus at the telephoto end.

In a zoom lens according to a sixteenth aspect of the present invention, in the first to fifteenth aspects, each of the Gp1 group, the Gn1 group, the Gp2 group, and the Gn2 group may include one lens group.

An imaging device according to a seventeenth aspect of the present invention may include the zoom lens according to the first aspect to the sixteenth aspect, and an image sensor that is provided on an image side of the zoom lens and converts an optical image formed by the zoom lens into an electrical signal.

The optical system and the imaging device described in the above embodiments and examples are one aspect of the zoom lens and the imaging device according to the present invention, and correspond to the optical system according to the first to sixteenth aspects and the imaging device according to the seventeenth aspect. According to the zoom lens and the imaging device of each of the above aspects, the same operational effects as those described in the above embodiments and examples are obtained. The zoom lens and the imaging device according to the present invention are not limited to the zoom lens and the imaging device described in the embodiments and the examples, and can be appropriately changed within the scope of the zoom lens and the imaging device of each aspect.

The zoom lens according to the present invention can be suitably applied to, for example, a zoom lens of an imaging device such as a film camera, a digital still camera, or a digital video camera.

What is claimed is:

1. A zoom lens comprising:

a first lens group having negative refractive power and a subsequent group in order from an object side to an image side, wherein the subsequent group includes, in order from an object side to an image side, a Gp1 group including one or more lens groups and having positive refractive power as a whole, a Gn1 group including one or more lens groups and having negative refractive power as a whole, a Gp2 group including one or more lens groups and having positive refractive power as a whole, and a Gn2 group including one or more lens groups and having negative refractive power as a whole, and an aperture diaphragm is disposed closer to an object side than the Gp2 group, an interval between adjacent lens groups changes at least during one of zooming and focusing, and a following expression is satisfied:

$$0.40<fn1/fn2<3.55 \tag{1}$$

$$0.50<(m1-mp1)/fw<2.30 \tag{2}$$

$$1.00<Lw/fw<9.00 \tag{3}$$

where fn1 is a focal length of the Gn1 group during infinity focus at a telephoto end, fn2 is a focal length of the Gn2 group during infinity focus at a telephoto end, m1 is an amount of movement of the first lens group during infinity focus when zooming from a wide angle end to a telephoto end, mp1 is an amount of movement of the Gp1 group during infinity focus during zooming from a wide angle end to a telephoto end, Lw is a total optical length of the zoom lens during infinity focus at a wide angle end, and fw is a focal length of the zoom lens during infinity focus at a wide angle end.

2. The zoom lens according to claim 1, satisfying a following expression:

$$0.10 < fp1/fp2 < 10.00 \quad (4)$$

where fp1 is a focal length of the Gp1 group during infinity focus at a telephoto end, and fp2 is a focal length of the Gp2 group during infinity focus at a telephoto end.

3. The zoom lens according to claim 1, satisfying a following expression:

$$-5.00 < f1/fp2 < -0.10 \quad (5)$$

where f1 is a focal length of the first lens group, and fp2 is a focal length of the Gp2 group during infinity focus at a telephoto end.

4. The zoom lens according to claim 1, satisfying a following expression:

$$1.00 < fp1/fw < 10.00 \quad (6)$$

where fp1 is a focal length of the Gp1 group during infinity focus at a telephoto end.

5. The zoom lens according to claim 1, satisfying a following expression:

$$0.50 < fp2/fw < 8.00 \quad (7)$$

where fp2 is a focal length of the Gp2 group during infinity focus at a telephoto end.

6. The zoom lens according to claim 1, satisfying a following expression:

$$-8.00 < fn2/fw < -1.00 \quad (8)$$

7. The zoom lens according to claim 1, satisfying a following expression:

$$1.00 < |\beta p1t/\beta p1w| < 20.00 \quad (9)$$

where $\beta p1t$ is a lateral magnification of the Gp1 group during infinity focus at a telephoto end, and $\beta p1w$ is a lateral magnification of the Gp1 group during infinity focus at a wide angle end.

8. The zoom lens according to claim 1, satisfying a following expression:

$$1.00 < |\beta p2t/\beta p2w| < 15.00 \quad (10)$$

where $\beta p2t$ is a lateral magnification of the Gp2 group during infinity focus at a telephoto end, and $\beta p2w$ is a lateral magnification of the Gp2 group during infinity focus at a wide angle end.

9. The zoom lens according to claim 1, satisfying a following expression:

$$1.00 < |\beta n2t/\beta n2w| < 10.00 \quad (11)$$

where $\beta n2t$ is a lateral magnification of the Gn2 group during infinity focus at the telephoto end, and $\beta n2w$ is a lateral magnification of the Gn2 group during infinity focus at a wide angle end.

10. The zoom lens according to claim 1, wherein a GL group including one or more lens groups is disposed closest to an image side of the subsequent group, and a following expression is satisfied:

$$0.50 < |\beta Lt/\beta Lw| < 10.00 \quad (12)$$

where $\beta Lt$ is a lateral magnification of the GL group during infinity focus at a telephoto end, and $\beta Lw$ is a lateral magnification of the GL group during infinity focus at a wide angle end.

11. The zoom lens according to claim 1, wherein a GL group including one or more lens groups is disposed closest to an image side of the subsequent group, and the GL group includes a positive lens GLp closest to an object side.

12. The zoom lens according to claim 11, satisfying a following expression:

$$1.80 < ndLp < 2.20 \quad (13)$$

where ndLp is a refractive index at line d of the positive lens GLp.

13. The zoom lens according to claim 1, wherein a GL group including one or more lens groups is disposed closest to the image side of the subsequent group, and the GL group includes at least one or more negative lenses GLn, and satisfies the following expression:

$$1.70 < ndLnave < 2.20 \quad (14)$$

where ndLnave is an average value of refractive indexes of the negative lenses GLn included in the GL group at line d.

14. The zoom lens according to claim 1, wherein the Gn2 group moves on an optical axis during focusing.

15. The zoom lens according to claim 1, satisfying a following expression:

$$-15.00 < (1-\beta n2t^2) \times \beta n2rt^2 < -1.10 \quad (15)$$

where $\beta n2t$ is a lateral magnification of the Gn2 group during infinity focus at a telephoto end, and $\beta n2rt$ is a synthesized lateral magnification of all groups on an image side with respect to the Gn2 group during infinity focus at a telephoto end.

16. The zoom lens according to claim 1, wherein each of the Gp1 group, the Gn1 group, the Gp2 group, and the Gn2 group includes one lens group.

17. An imaging device comprising:

the zoom lens according to claim 1; and an image sensor that is provided on an image side of the zoom lens and converts an optical image formed by the zoom lens into an electrical signal.

* * * * *